US011551490B2

(12) United States Patent
Bhardwaj et al.

(10) Patent No.: US 11,551,490 B2
(45) Date of Patent: *Jan. 10, 2023

(54) SYSTEMS AND METHODS TO FIT AN IMAGE OF AN INVENTORY PART

(71) Applicant: eBay Inc., San Jose, CA (US)

(72) Inventors: Anurag Bhardwaj, Sunnyvale, CA (US); Robinson Piramuthu, Oakland, CA (US); Neelakantan Sundaresan, Mountain View, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/149,342

(22) Filed: Oct. 2, 2018

(65) Prior Publication Data

US 2019/0035179 A1    Jan. 31, 2019

Related U.S. Application Data

(63) Continuation of application No. 14/214,357, filed on Mar. 14, 2014, now Pat. No. 10,115,248.

(Continued)

(51) Int. Cl.
G06F 3/048 (2013.01)
G07C 5/08 (2006.01)
(Continued)

(52) U.S. Cl.
CPC ....... G07C 5/0825 (2013.01); G06F 3/04842 (2013.01); G06T 11/00 (2013.01)

(58) Field of Classification Search
CPC ........... G06Q 30/0643; G06Q 30/0641; G06Q 30/0601; G06F 16/70; G06F 16/583; G06F 16/5838; G06F 16/29; G06F 16/93; G06F 16/532; G06F 40/205; G06F 16/50; G06F 16/24578; G06F 16/353; G06F 16/58; G06F 16/338; G06F 3/04842; G06T 11/00; G06T 7/00; G06T 7/11; G06T 2207/10148; G06T 2207/20021; G06T 2207/20084; G06T 2207/20104; G06T 2207/20182;

(Continued)

(56) References Cited

U.S. PATENT DOCUMENTS 6,339,763 B1  1/2002  Divine et al.
8,566,714 B1  10/2013  Stringer et al.
(Continued)

OTHER PUBLICATIONS

Bin-Feng Lin, Yi-Ming Chan, Li-Chen Fu, Pei-Yung Hsiao, Li-An Chuang, Shin-Shinh Huang, Min-Fang Lo, Integrating Appearance and Edge Features for Sedan Vehicle Detection in the Blind-Spot Area, IEEE (Year: 2012).*

(Continued)

*Primary Examiner* — Mohamed Abou El Seoud
(74) *Attorney, Agent, or Firm* — Holland & Hart LLP

(57) ABSTRACT

Systems and methods to fit an image of an inventory part are described. In one aspect, a method includes receiving images of items over a computer network from a server, capturing a live video image of an object using a camera, playing the live video of the object on an electronic display, and continually refitting an image of a first item from the received images of items to the object as the object changes perspective in the video by applying an affine transformation to the image of the first item.

19 Claims, 16 Drawing Sheets

Related U.S. Application Data

(60) Provisional application No. 61/784,914, filed on Mar. 14, 2013.

(51) Int. Cl.
  *G06F 3/04842* (2022.01)
  *G06T 11/00* (2006.01)

(58) Field of Classification Search
  CPC ... G06T 2207/20221; G06T 7/74; G06K 9/00; G06K 2209/01; G06K 9/00288; G06K 9/00442; G06K 9/72; G06K 9/6292; G06K 9/00268; G06K 9/6857; G06K 9/48; G06K 9/00664; G06K 9/00087; G06K 9/00221; G06K 9/00281; G06K 9/00067; G06K 2209/19; G06K 9/36; G06N 20/00; G06N 20/10; G06N 3/02; G07C 5/0825
  See application file for complete search history.

(56) References Cited

U.S. PATENT DOCUMENTS

| | | |
|---|---|---|
| 9,129,179 B1 | 9/2015 | Wong |
| 10,115,248 B2 | 10/2018 | Bhardwaj et al. |
| 2008/0043041 A2* | 2/2008 | Hedenstroem ......... G06T 11/60 345/634 |
| 2008/0084429 A1 | 4/2008 | Wissinger |
| 2008/0209010 A1 | 8/2008 | Zitnick III et al. |
| 2008/0288369 A1 | 11/2008 | Hunter |
| 2009/0196485 A1* | 8/2009 | Mueller ................. G06K 9/036 382/137 |
| 2010/0223216 A1* | 9/2010 | Eggert ............... G06K 9/00979 706/12 |
| 2011/0188713 A1* | 8/2011 | Chin ..................... G06F 16/583 382/118 |
| 2012/0303615 A1* | 11/2012 | Goswami ................ G06F 16/00 707/723 |
| 2013/0013578 A1 | 1/2013 | Yang et al. |
| 2013/0063487 A1* | 3/2013 | Spiegel .................. G06T 11/00 345/633 |
| 2013/0088490 A1 | 4/2013 | Rasmussen et al. |
| 2014/0254927 A1* | 9/2014 | Bhardwaj ............. G06F 16/532 382/165 |
| 2014/0282060 A1 | 9/2014 | Bhardwaj et al. |
| 2014/0282137 A1 | 9/2014 | Lin et al. |

OTHER PUBLICATIONS

"U.S. Appl. No. 14/214,357, Non Final Office Action dated Nov. 16, 2015", 16 pgs.

"U.S. Appl. No. 14/214,357, Response filed Feb. 16, 2016 to Non Final Office Action dated Nov. 16, 2015", 12 pgs.

"U.S. Appl. No. 14/214,357, Final Office Action dated Mar. 24, 2016", 14 pgs.

"U.S. Appl. No. 14/214,357, Examiner Interview Summary dated Feb. 12, 2016", 3 pgs.

"U.S. Appl. No. 14/214,357, Examiner Interview Summary dated May 18, 2015", 3 pgs.

"U.S. Appl. No. 14/214,357, Response filed May 23, 2016 to Final Office Action dated Mar. 24, 2016", 12 pgs.

"U.S. Appl. No. 14/214,357, Non Final Office Action dated Oct. 26, 2016", 14 pgs.

"U.S. Appl. No. 14/214,357, Response filed Feb. 8, 2017 to Non Final Office Action dated Oct. 26, 2016", 12 pgs.

"U.S. Appl. No. 14/214,357, Final Office Action dated Mar. 24, 2017", 18 pgs.

"U.S. Appl. No. 14/214,357, Response filed May 24, 2017 to Final Office Action dated Mar. 24, 2017", 16 pgs.

"U.S. Appl. No. 14/214,357, Advisory Action dated Jun. 14, 2017", 2 pgs.

"U.S. Appl. No. 14/214,357, Response filed Jul. 24, 2017 to Final Office Action dated Mar. 24, 2017", 17 pgs.

"U.S. Appl. No. 14/214,357, Non Final Office Action dated Oct. 4, 2017", 17 pgs.

"U.S. Appl. No. 14/214,357, Examiner Interview Summary dated Dec. 28, 2017", 3 pgs.

"U.S. Appl. No. 14/214,357, Response filed Jan. 30, 2018 to Non Final Office Action dated Oct. 4, 2017", 13 pgs.

"U.S. Appl. No. 14/214,357, Final Office Action dated Mar. 27, 2018", 22 pgs.

"U.S. Appl. No. 14/214,357, Response filed May 29, 2018 to Final Office Action dated Mar. 27, 2018", 11 pgs.

"U.S. Appl. No. 14/214,357, Notice of Allowance dated Jun. 25, 2018", 9 pgs.

\* cited by examiner

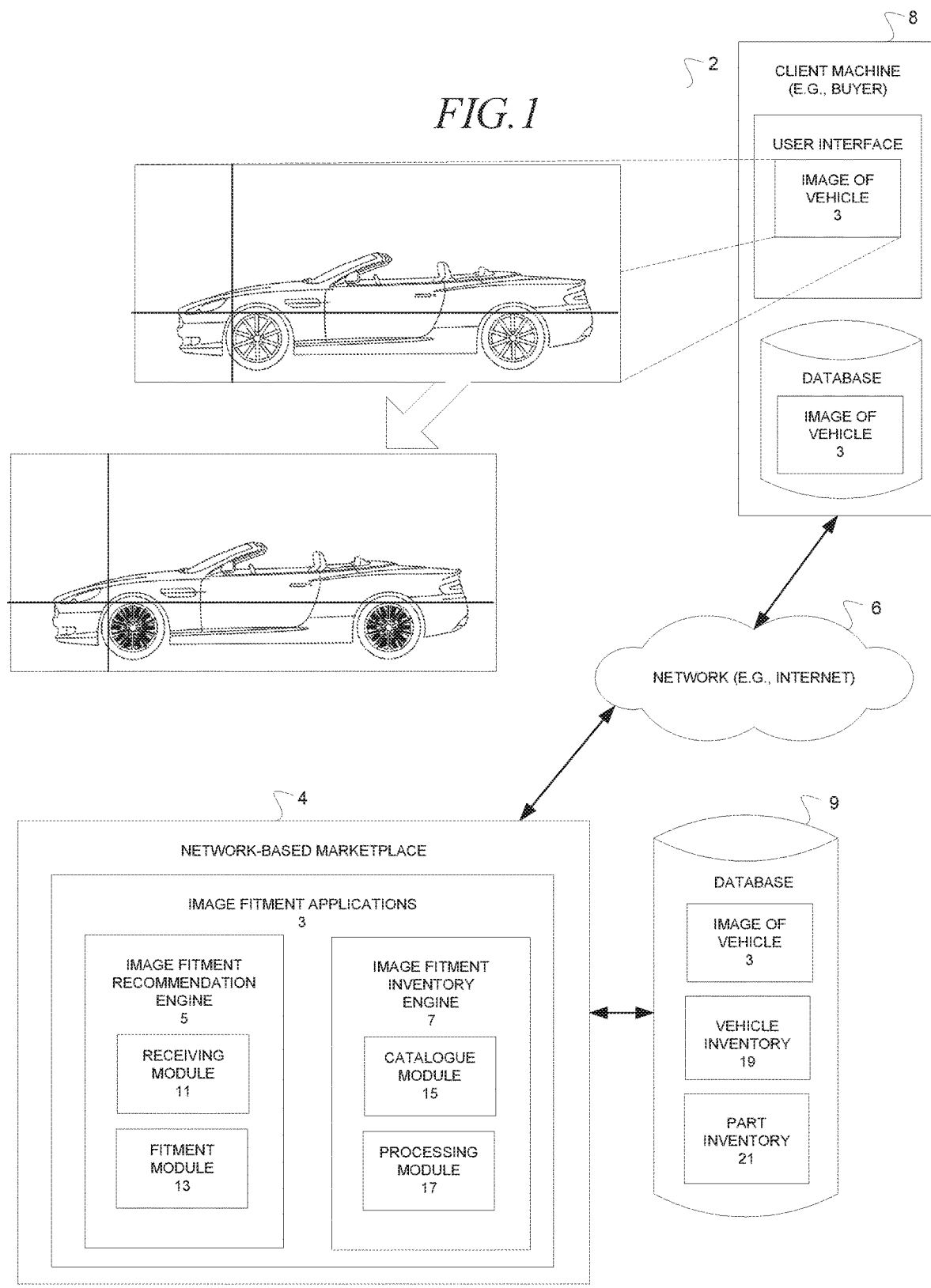

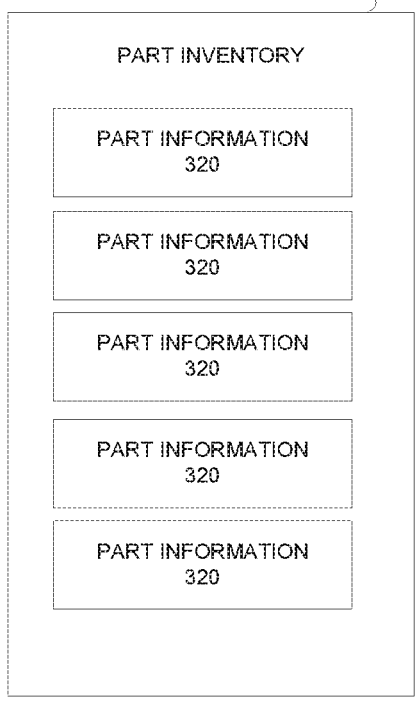
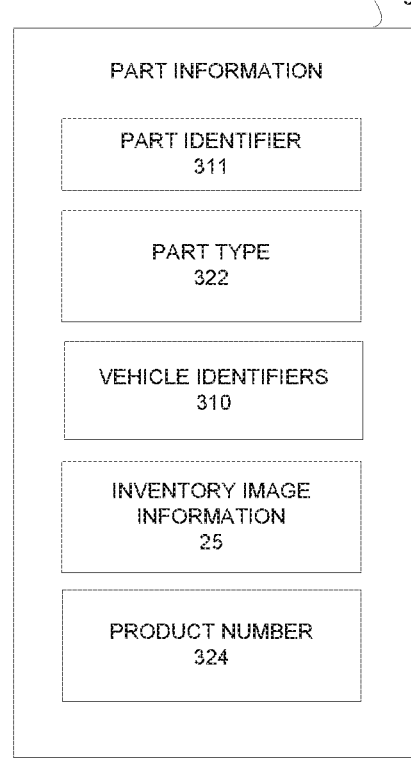
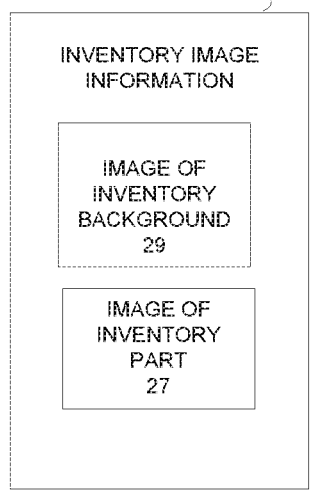

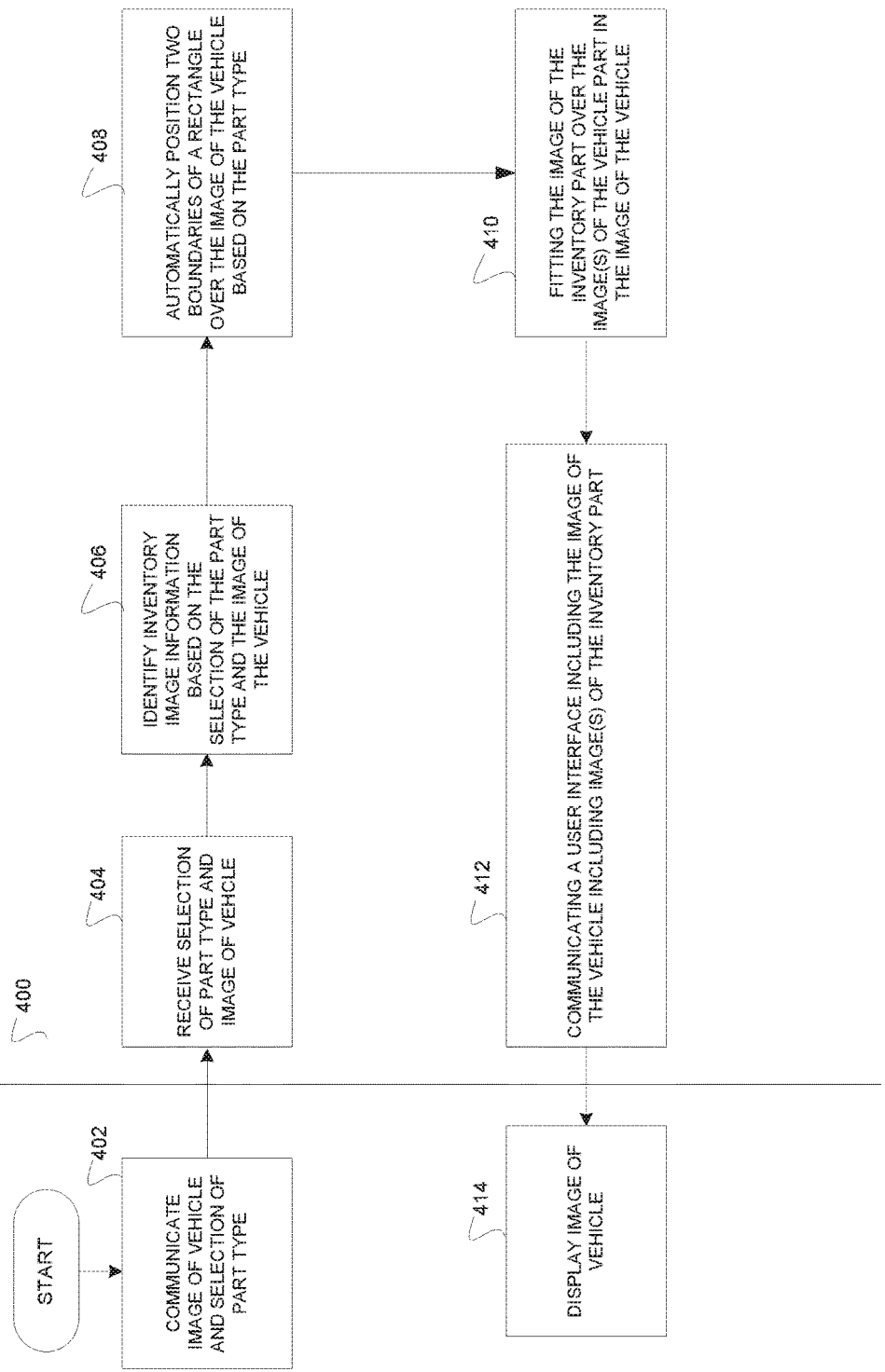

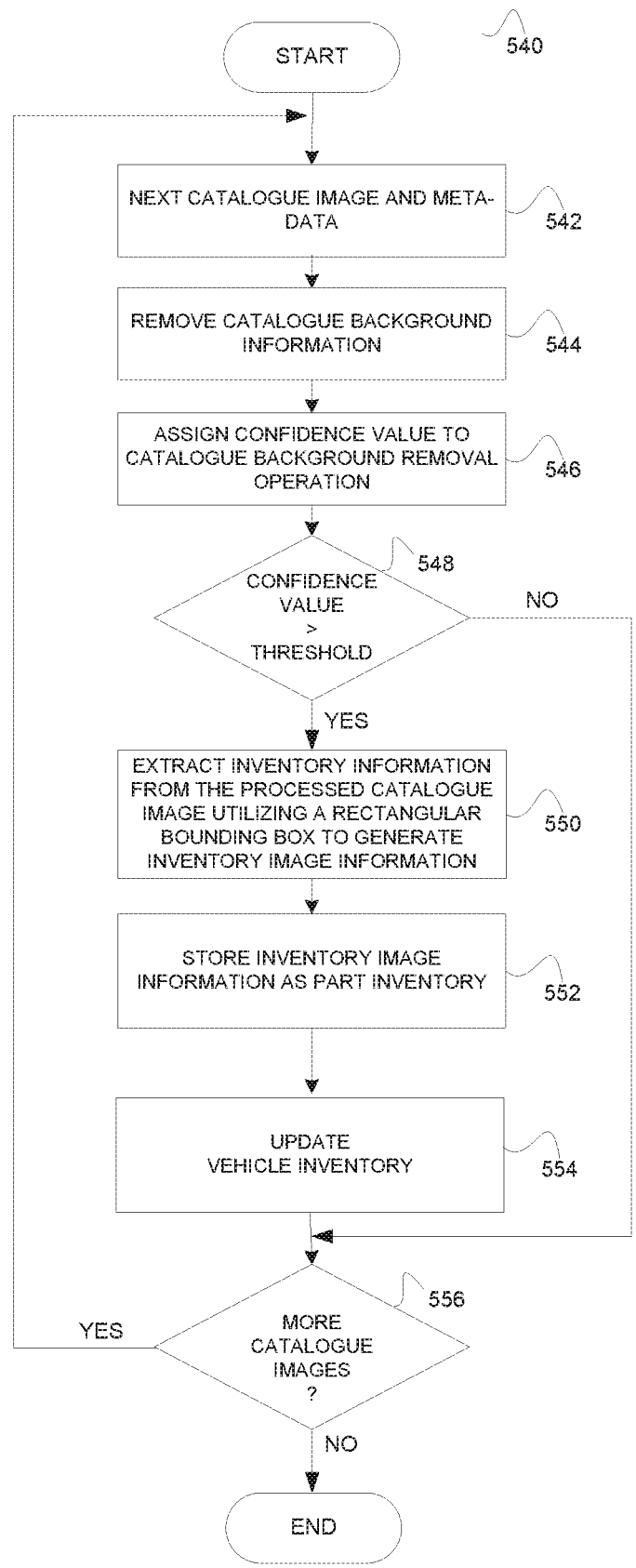

SYSTEMS AND METHODS TO FIT AN IMAGE OF AN INVENTORY PART

RELATED APPLICATIONS

This application is a continuation of and claims priority to U.S. patent application Ser. No. 14/214,357, filed Mar. 14, 2014, and entitled "SYSTEMS AND METHODS TO FIT AN IMAGE OF AN INVENTORY PART," which claims the priority benefit of U.S. Provisional Application No. 61/784,914, filed Mar. 14, 2013. The contents of these prior applications are considered part of this application, and are hereby incorporated by reference in their entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014. All Rights Reserved.

TECHNICAL FIELD

This disclosure relates to the technical field of data processing, and more particularly, to systems and methods to fit an image of an inventory part.

RELATED ART

Images may be used to communicate information efficiently or to communicate information that is not possible to communicate with text. Indeed, a picture is said to be worth a thousand words, and viewing a picture is preferable to listening to a thousand words.

BRIEF DESCRIPTION OF THE DRAWINGS

Embodiments are illustrated, by way of example and not limitation, in the figures of the accompanying drawings, in which:

FIG. 1 illustrates a system to fit an image of an inventory part and to build vehicle and parts inventories, according to an embodiment;

FIG. 8C is a block diagram illustrating a part inventory, according to an embodiment;

FIG. 8D is a block diagram illustrating part information, according to an embodiment;

FIG. 8E is a block diagram illustrating inventory image information, according to an embodiment;

FIG. 9 is a flow diagram illustrating a method, according to an embodiment, to fit an image of an inventory part;

FIG. 10C is a flow diagram illustrating a method, according to an embodiment, to build vehicle and parts inventories;

DETAILED DESCRIPTION

Figure 2A:
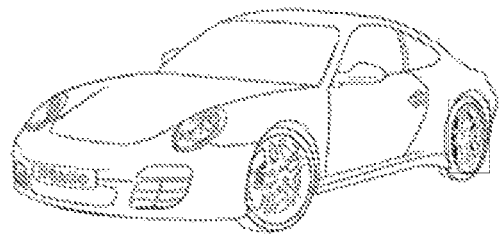
FIG. 2A is a block diagram illustrating a perspective view of a car, according to an embodiment.

In the following description, for purposes of explanation, numerous specific details are set forth in order to provide a thorough understanding of some example embodiments. It will be evident, however, to one of ordinary skill in the art that embodiments of the present disclosure may be practiced without these specific details.

Described in detail herein are systems and methods for providing a fitment of an image of an inventory part over an image of a vehicle part that is included in an image of a vehicle. The image of the inventory part may be obtained from a part inventory or an items table and the fitment may be performed by a network-based marketplace in response to a user who communicates the image of the vehicle (e.g., photograph) over a network to the network-based marketplace. The image of the inventory part (e.g., hubcaps, wheels, spoiler, mirror, etc.) that is fitted over the image of the vehicle part may be identified based on the make, model and year of the vehicle that, in turn, may be identified based on the image of the vehicle. In some embodiments, touching the image of the inventory part on a touch-sensitive screen (e.g., smartphone, tablet, etc.) may advance to the next inventory part being superimposed, in the form of an image, over the image of the vehicle part. In some embodiments, a single user interface may comprise a gallery that includes multiple images of a single vehicle, each image respectively being superimposed with different images of inventory parts (e.g., different hubcaps). Accordingly, an owner of a vehicle may quickly evaluate the visual impact of inventory parts as each are visually superimposed over an image of their vehicle without the need to physically position the actual part near the vehicle.

The fitment of the image of the part may be preceded by building a vehicle inventory and a part inventory. The parts in the part inventory may include hubcaps and wheels or any other part of a vehicle. Building the inventories may include processing images of vehicles to isolate images of parts (e.g., hubcaps and wheels) from background images and other extraneous images that are included in the image of the vehicle. For example, an image of a part may be isolated from the image of a vehicle that further includes extraneous images of people, trees, or other objects that obscure the image of the part. Building the inventories may include processing an electronic catalogue that includes images of vehicles. In one embodiment, the shape of a mask may be based on an assumed shape of the part (e.g., hubcap/wheel) to perform an isolation or extraction from the image of the vehicle that is received from the catalogue. In one embodiment, a confidence score may be assigned to the resulting processed image that is based on factors such as image resolution, number of hubcaps/wheels shown in the given image, and the like. Images that are associated with a low confidence score (or some predetermined threshold) may be identified as unsuitable for visual fitment. Images associated with a satisfactory confidence score may be stored in the parts inventory for subsequent fitment over images of the vehicle parts included in images of vehicles.

Images of inventory parts may further be retrieved from listings and fitted over an image of a vehicle part that is included in an image of a vehicle. The listings may be authored by sellers and stored in an items table. The listings may describe items (e.g., products or services) that are being offered for sale (e.g., auction, purchase or combination) on a network-based marketplace. The listings may include an image of an inventory part that is compatible with one or more vehicles.

FIG. 1 illustrates a system 2 to fit an image of an inventory part and to build vehicle and parts inventories, according to an embodiment. Broadly, the system 2 may include a client machine 8, operated by a buyer, that communicates with a network-based marketplace 4 over a network 6 (e.g., the Internet) to auction or transact products and/or services including vehicles and vehicle parts. The network-based marketplace 4 may include image fitment applications 3 including an image fitment recommendation engine 5 and an image fitment inventory engine 7. The image fitment recommendation engine 5 may include a receiving module 11 that receives the image of a vehicle 3 and a fitment module 13 that processes the image of the vehicle 3 to fit an image of an inventory part over one or more images of a vehicle part that are included in the image of the vehicle 3. Broadly, the receiving module 11 may receive the image of the vehicle 3 from the client machine 8 and store the image of the vehicle 3 in a database 9 that is coupled to the network-based marketplace 4. The fitment module 13 may identify vehicle identification information (e.g., make, model, year) based on the image of the vehicle 3. Further, the fitment module 13 may automatically position two boundaries of a rectangle over the image of the vehicle 3 to identify a rectangle that includes a vehicle part (e.g., hubcap) the type of which was previously selected by the user. For example, the user may utilize a pull-down menu to select one of multiple part types and the fitment module 13 may automatically position the two boundaries to form a rectangle superimposed over the image of the vehicle 3 to include an image of a vehicle part of the selected type. In another embodiment, the fitment module 13 may receive, over the network 6, coordinates that identify a location of the boundaries of the rectangle as determined by the user who positions the boundaries of the rectangle at the client machine 8 to define the location of the rectangle. Further, the fitment module 13 may identify vehicle identification information (e.g., make, model, year) and associated part type that identify compatible parts in a vehicle inventory 19 based on the image of the vehicle 3. Further, the fitment module 13 may identify images of inventory parts in a vehicle inventory 19 that are stored in the database 9 based on the part type, fit the image of the inventory part to the image of the vehicle part that is contained by the rectangle, fit the image of the inventory part to one or more images of the vehicle part that are not contained by the rectangle, and communicate, back over the network 6, a user interface including the image of the vehicle 3 superimposed with image(s) of the inventory part. The image fitment inventory engine 7 may include a catalogue module 15 and a processing module 17. The catalogue module 15 may receive images from an electronic catalogue (not shown) that respectively include images of vehicles/parts and the processing module 17 may process the images to generate the vehicle inventory 19 and the part inventory 21.

FIG. 2A is a block diagram illustrating a perspective view 23 of a car, according to an embodiment. The perspective view 23 may include a rectangle that is superimposed over the perspective view 23 to identify an image of a vehicle part. FIGS. 2B-2F provide an overview of an example of fitting an image of an inventory part over the image of the vehicle part that is contained in the rectangle.

Figure 2B:
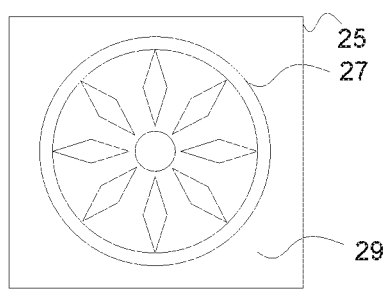
FIG. 2B is a block diagram illustrating inventory image information, according to an embodiment.

FIG. 2B is a block diagram illustrating inventory image information 25, according to an embodiment. The inventory image information 25 may be stored in the part inventory 21 in the database 9 or an items table in the database 9 and include an image of inventory part 27 (e.g., hubcap) and an image of inventory background 29. The inventory image information 25 may be processed to resemble the same shape as the image of the vehicle part that is contained in the rectangle.

Figure 2C:
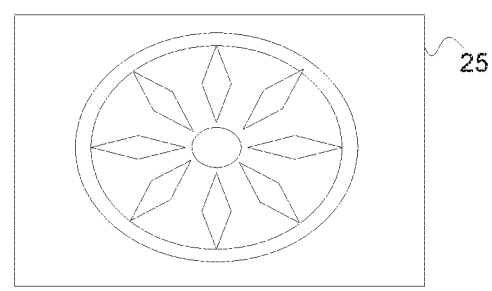
FIG. 2C is a block diagram illustrating an affine transform, according to an embodiment, of inventory image information.

FIG. 2C is a block diagram illustrating an affine transformation 31, according to an embodiment, of the inventory image information 25. An affine transformation is any transformation that preserves collinearity (i.e., all points lying on a line initially still lie on a line after transformation) and ratios of distances (e.g., the midpoint of a line segment remains the midpoint after transformation). The affine transformation 31 may be described as a "stretch" "X-axis" affine transformation because the inventory image information 25 (e.g., rectangle containing the hubcap) is stretched along an X-axis to form a shape that is analogous to the image of the inventory part (e.g., hubcap) contained in the rectangle illustrated in FIG. 2A.

Figure 2D:
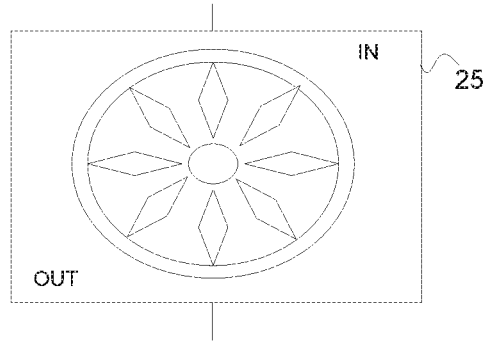
FIG. 2D is a block diagram illustrating an affine transform, according to an embodiment, of inventory image information.

FIG. 2D is a block diagram illustrating an affine transformation 33, according to an embodiment, of inventory image information 25. The affine transformation 33 may be described as a "rotate" "right-in, left-out" around a center because the inventory image information 25 (e.g., hubcap) is rotated in the described manner to form a shape that is analogous to the image of the inventory part (e.g., hubcap) contained in the rectangle illustrated in FIG. 2A.

Figure 2E:
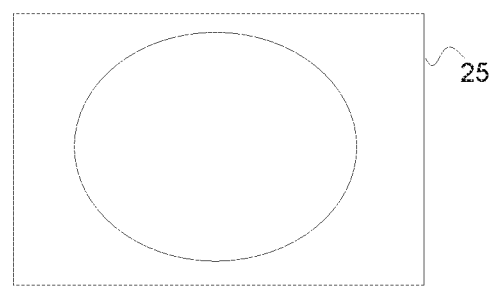
FIG. 2E is a block diagram illustrating a masking, according to an embodiment.

FIG. 2E is a block diagram illustrating a masking 35, according to an embodiment, of the image of inventory background 29 from the inventory image information 25 to form a shape that is analogous to the image of the inventory part (e.g., hubcap) contained in the rectangle illustrated in FIG. 2A.

Figure 2F:
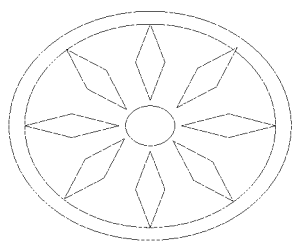
FIG. 2F is a block diagram illustrating an image of an inventory part, according to an embodiment.

FIG. 2F is a block diagram illustrating an analogous image 41, according to an embodiment, after the stretching, rotating, and masking to form a shape that is analogous to the image of the vehicle part (e.g., hubcap) contained in the rectangle illustrated in FIG. 2A.

Figure 3A:
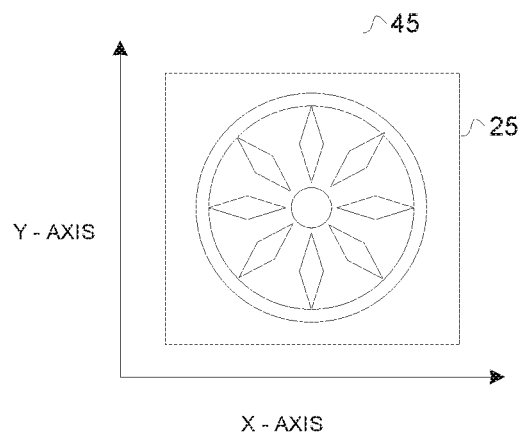
FIG. 3A is a block diagram illustrating inventory image information, according to an embodiment, plotted on X and Y axis.
Figure 3B:
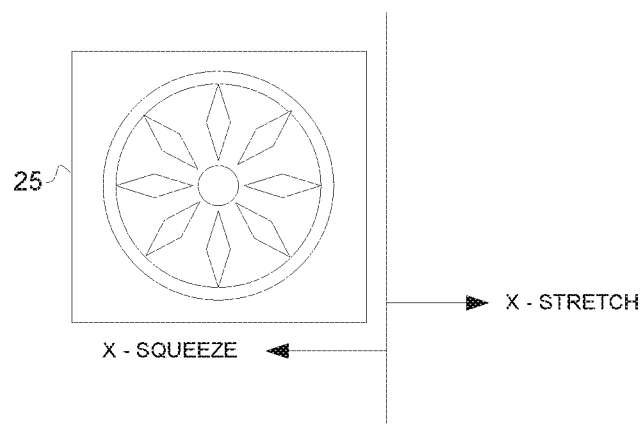
FIG. 3B is a block diagram illustrating an affine transformation, according to an embodiment, along an X-axis.
Figure 3C:
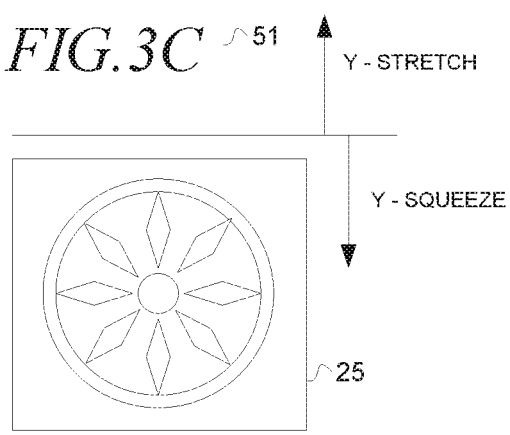
FIG. 3C is a block diagram illustrating an affine transformation, according to an embodiment, along a Y-axis.

FIGS. 3A-3C are block diagrams illustrating stretching/squeezing affine transformations of inventory image information 25 along X and Y-axis to form a shape that is analogous to the image of the vehicle part (e.g., hubcap) contained in a rectangle that is superimposed over an image of a vehicle. FIG. 3A is a block diagram illustrating a plotting 45 of inventory image information 25, according to an embodiment, against X and Y axis. FIG. 3B is a block diagram illustrating an affine transformation 47, according to an embodiment, that may be described as stretching or squeezing from the far end of the inventory image information 25 (e.g., the end away from the origin) according to a measured quantity along the X-axis. FIG. 3C is a block diagram illustrating an affine transformation 51, according to an embodiment, that may be described as stretching or squeezing from the far end of the inventory image information 25 (e.g., the end away from the origin) according to a measured quantity along the Y-axis.

Figure 4A:
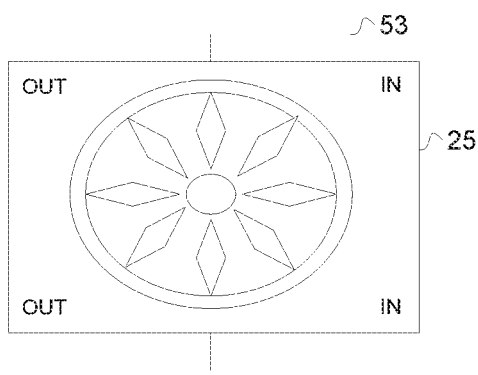
FIG. 4A is a block diagram illustrating an affine transformation, according to an embodiment, around a center.
Figure 4B:
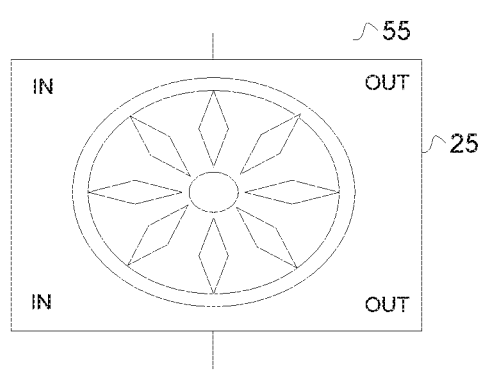
FIG. 4B is a block diagram illustrating an affine transformation, according to an embodiment, around a center.

FIGS. 4A-4B are block diagrams illustrating an out-of-plane rotating affine transformations of inventory image information 25 around a center to form a shape that is analogous to an image contained in a rectangle that is superimposed over an image of a vehicle. FIG. 4A is a block diagram illustrating an out-of-plane rotating affine transformation 53, according to an embodiment, of inventory image information 25 around a center, "right-in, left-out." FIG. 4B is a block diagram illustrating an out-of-plane rotating affine transformation 55, according to an embodiment, of inventory image information 25 around a center, "right-out, left-in."

Figure 4C:
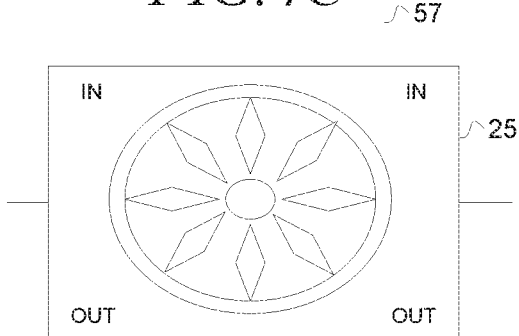
FIG. 4C is a block diagram illustrating an affine transformation, according to an embodiment, around a center.
Figure 4D:
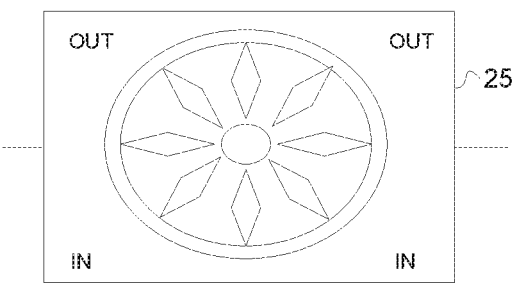
FIG. 4D is a block diagram illustrating an affine transformation, according to an embodiment, around a center.

FIGS. 4C-4D are block diagrams illustrating an out-of-plane rotating affine transformations of inventory image information 25 around a center to form a shape that is analogous to an image contained in a rectangle that is superimposed over an image of a vehicle. FIG. 4C is a block diagram illustrating an out-of-plane rotating affine transformation 57, according to an embodiment, of inventory image information 25 around a center, "top-in, bottom-out." FIG. 4D is a block diagram illustrating an out-of-plane rotating affine transformation 59, according to an embodiment, of inventory image information 25 around a center, "top-out, bottom-in."

Figure 4E:
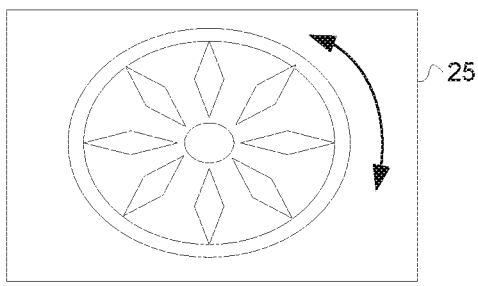
FIG. 4E is a block diagram illustrating an affine transformation, according to an embodiment, around a center.

FIG. 4E is a block diagram illustrating an in-plane rotating affine transformations 61, according to an embodiment, of inventory image information 25 around a center to simulate a rotation. For example, the inventory image information 25 including the image of a hubcap may be rotated in either direction to simulate spinning. Further for example, the spinning may be initiated on a touch-sensitive screen with a swiping motion by a user.

Figure 5:
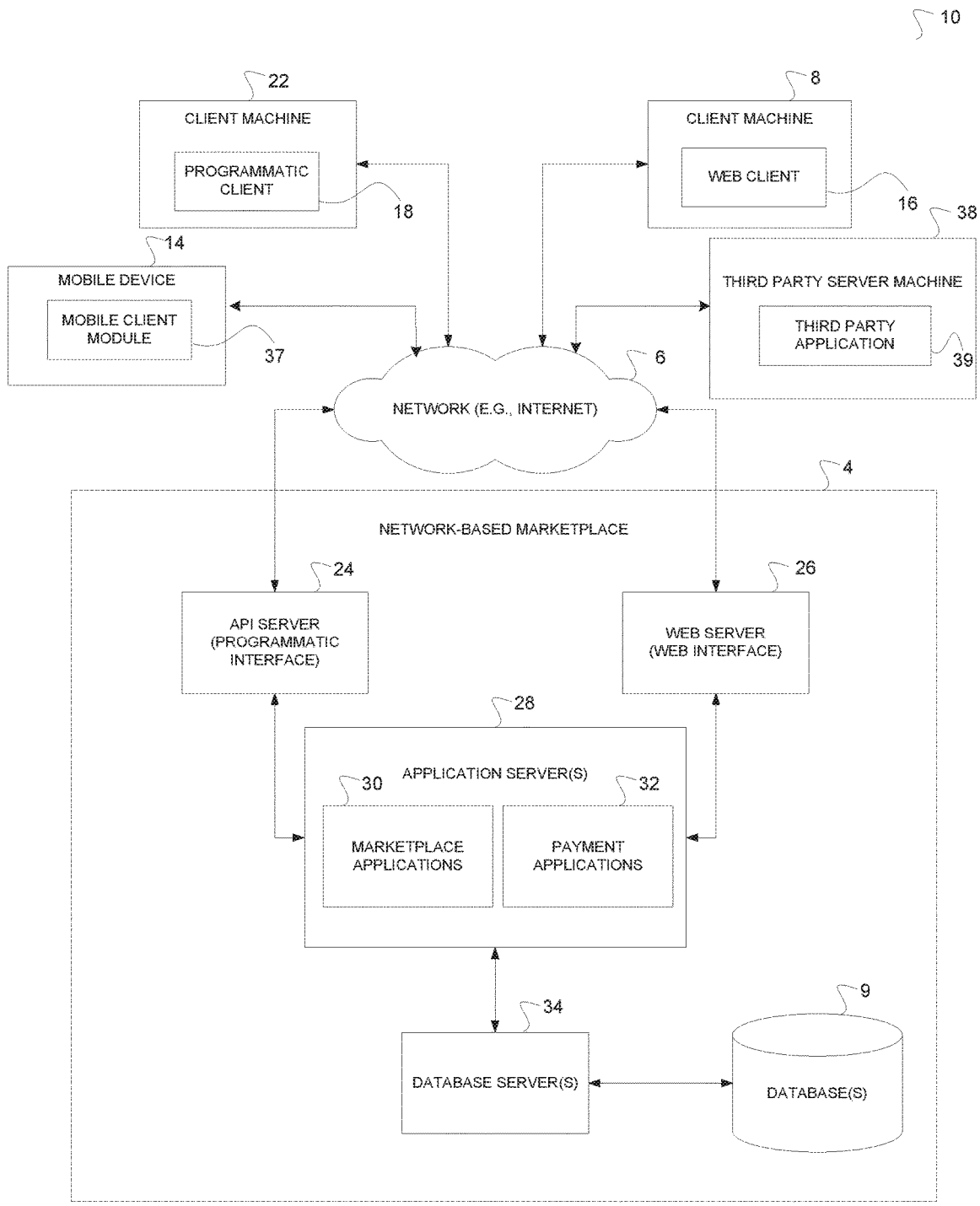
FIG. 5 illustrates a system to fit an image of an inventory part and to build a vehicle and parts inventories, according to an embodiment.

FIG. 5 illustrates a networked system 10, according to an embodiment, to fit an image of an inventory part and to build vehicle and parts inventories. The networked system 10 corresponds to the system 2 in FIG. 1 and, accordingly, the same or similar references have been used to indicate the same or similar features unless otherwise indicated. The network-based marketplace 4 provides server-side functionality, via the network 6 (e.g., the Internet or Wide Area Network (WAN)) to one or more clients. FIG. 5 illustrates, for example, a web client 16 (e.g., a browser, such as the Internet Explorer browser developed by Microsoft Corporation of Redmond, Wash. State) executing on the client machine 8, a programmatic client 18 executing on a client machine 22, and a mobile client module 37 executing on a mobile device 14. For example, the mobile client module 37 may be embodied as one or more mobile modules that are used to support a Blackberry™ wireless hand-held business or smart phone manufactured by Research In Motion of Waterloo, Ontario.

An Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 9.

The marketplace applications 30 may provide a number of marketplace functions and services to users that access the network-based marketplace 4. The payment applications 32 may likewise provide a number of payment services and functions to users. The payment applications 32 may allow users to accumulate value in accounts and then to later redeem the accumulated value for products (e.g., goods or services) that are made available via the marketplace applications 30. The value may be accumulated in a commercial currency, such as the U.S. dollar, or a proprietary currency, such as "points." While the marketplace applications 30 and payment applications 32 are shown in FIG. 5 to both form part of the network-based marketplace 4, it will be appreciated that, in alternative embodiments, the payment applications 32 may form part of a payment service that is separate and distinct from the network-based marketplace 4.

Further, while the networked system 10 shown in FIG. 5 employs client-server architecture, embodiments of the present disclosure are of course not limited to such an architecture and could equally well find application in a distributed, or peer-to-peer, architecture system, for example. The various marketplace applications 30 and payment applications 32 could also be implemented as stand-alone software programs, which do not necessarily have networking capabilities.

The web client 16 and the mobile client module 37 access the various marketplace applications 30 and payment applications 32 via the web interface supported by the web server 26. Similarly, the programmatic client 18 accesses the various services and functions provided by the marketplace applications 30 and payment applications 32 via the programmatic interface provided by the API server 24. The programmatic client 18 may, for example, be a seller application (e.g., the TurboLister application developed by eBay Inc., of San Jose, Calif.) to enable sellers to author and manage listings on the network-based marketplace 4 in an off-line manner, and to perform batch-mode communications between the programmatic client 18 and the network-based marketplace 4.

FIG. 5 also illustrates a third party application 39, executing on a third party server machine 38, as having programmatic access to the networked system 10 via the programmatic interface provided by the API server 24. The mobile device 14 may be embodied as a mobile phone, a personal digital assistant (PDA), a cell phone, or any other wireless device. For example, the mobile device 14 may be embodied as an iPhone mobile phone manufactured by Apple, Inc. of Cupertino, Calif., or, as previously mentioned, a Blackberry™ mobile phone manufactured by Research In Motion of Waterloo, Ontario.

Marketplace and Payment Applications

Figure 6:
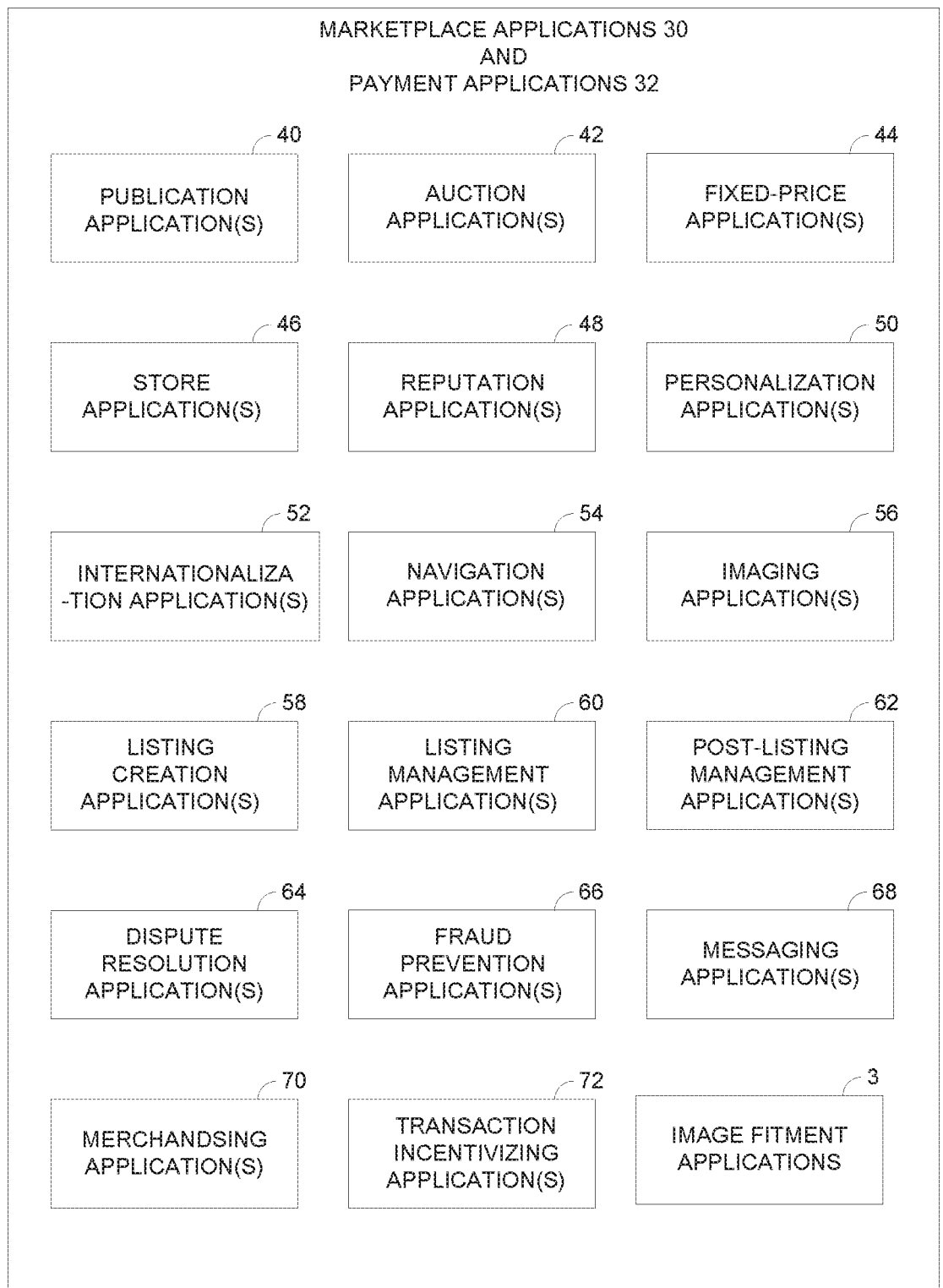
FIG. 6 is a block diagram illustrating marketplace applications and payment applications, according to an embodiment.

FIG. 6 is a block diagram illustrating marketplace applications 30 and payment applications 32 that, in one example embodiment, are provided as part of the networked system 10 of FIG. 5. The marketplace applications 30 and payment applications 32 may be hosted on dedicated or shared server machines, as shown on FIG. 5, that are communicatively coupled to enable communications between the server machines. The applications 30 and 32 themselves are communicatively coupled (e.g., via appropriate interfaces) to each other and to various data sources, so as to allow information to be passed between the applications 30 and 32 or so as to allow the applications 30 and 32 to share and access common data. The applications 30 and 32 may furthermore access one or more databases 9 via the database servers 34, as shown on FIG. 5.

The network-based marketplace 4 of FIG. 5 may provide a number of publishing, listing and price-setting mechanisms whereby a seller may list (or publish information concerning) goods or services for sale; a buyer may indicate a desire to purchase such goods or services; and a price can be set for a transaction pertaining to the goods or services. To this end, the marketplace and payment applications 30 and 32 are shown to include at least one publication application 40 and one or more auction applications 42 which support auction-format listing and price setting mechanisms (e.g., English, Dutch, Vickrey. Chinese, Double, Reverse auctions, etc.). The various auction applications 42 may also provide a number of features in support of such auction-format listings, such as a reserve price feature, whereby a seller may specify a reserve price in connection with a listing, and a proxy-bidding feature, whereby a bidder may invoke automated proxy bidding.

A number of fixed-price applications 44 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose. Calif.) may be offered in conjunction with auction-format listings and may allow a buyer to purchase goods or services, which are also being offered for sale via an auction, for a fixed price that is typically higher than the starting price of the auction.

Store application(s) 46 allows a seller to group listings within a "virtual" store, which may be branded and otherwise personalized by and for the seller. Such a virtual store may also offer promotions, incentives and features that are specific and personalized to a relevant seller.

Reputation applications 48 allow users that transact, utilizing the network-based marketplace 4, to establish, build and maintain reputations, which may be made available and published to potential trading partners. Consider that where, for example, the network-based marketplace 4 supports person-to-person trading, users may otherwise have no history or other reference information whereby the trustworthiness and credibility of potential trading partners may be assessed. The reputation applications 48 allow a user to establish a reputation within the network-based marketplace 4 over time, for example, through feedback provided by other transaction partners and by the computation of a feedback score based on the feedback. For example, the feedback score may be publicly displayed by the network-based marketplace 4. Other potential trading partners may then reference such a feedback score for the purposes of assessing credibility and trustworthiness.

Personalization applications 50 allow users of the network-based marketplace 4 to personalize various aspects of their interactions with the network-based marketplace 4. For example, a user may, utilizing an appropriate personalization application 50, create a personalized reference page at which information regarding transactions to which the user is (or has been) a party may be viewed. Further, a personalization application 50 may enable a user to personalize listings and other aspects of their interactions with the networked system 10 and other parties.

The networked system 10 may support a number of marketplaces that are customized, for example, for specific geographic regions. A version of the networked system 10 may be customized for the United Kingdom, whereas another version of the networked system 10 may be customized for the United States. Some of these versions may operate as an independent marketplace, or may be customized (or internationalized) presentations of a common underlying marketplace. The networked system 10 may accordingly include a number of internationalization applications 52 that customize information for (and/or the presentation of information by) the networked system 10 according to predetermined criteria (e.g., geographic, demographic or marketplace criteria). For example, the internationalization applications 52 may be used to support the customization of information for a number of regional websites that are operated by the networked system 10 and that are accessible via the servers 24 and 26, both of FIG. 5.

Navigation of the network-based marketplace 4 may be facilitated by one or more navigation applications 54. For example, the navigation applications 54 may receive search information (e.g., a query) to search for items on the network-based marketplace 4 and process the search information to generate search results. The navigation applications 54 may further include a browser application (not shown) to enable users to browse various category, catalogue, or inventory data structures according to which listings may be classified within the networked system 10. Various other navigation applications 54 may be provided to supplement the search and browsing applications.

In order to make the listings available via the networked system 10 as visually informing and attractive as possible, the marketplace and payment applications 30 and 32 may include one or more imaging applications 56 with which users may upload images (e.g., thumbnail images) for inclusion within listings. An imaging application 56 also operates to incorporate images (e.g., thumbnail images) within viewed listings. The imaging applications 56 may also support one or more promotional features, such as image galleries that are presented to potential buyers. For example, sellers may pay an additional fee to have an image included within a gallery of images for promoted items.

Listing creation applications 58 enable sellers to conveniently author listings pertaining to goods or services that they wish to transact via the network-based marketplace 4, and listing management applications 60 enable sellers to manage such listings. Specifically, where a particular seller has authored and/or published a large number of listings, the management of such listings may present a challenge. The listing management applications 60 provide a number of features (e.g., auto-relisting, inventory level monitors, etc.) to assist the seller in managing such listings. The listing creation applications 58 may further facilitate a buyer watching specific listings or specific types of listings.

One or more post-listing management applications 62 may also assist sellers with a number of activities that may typically occur post-listing. For example, upon completion of an auction facilitated by one or more of the auction applications 42, a seller may wish to leave feedback regarding a particular buyer. To this end, a post-listing management application 62 may provide an interface to one or more of the reputation applications 48, so as to allow the seller conveniently to provide feedback regarding multiple buyers to the reputation applications 48.

Dispute resolution applications 64 provide mechanisms whereby disputes arising between transacting parties may be resolved. For example, the dispute resolution applications 64 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 66 implement fraud detection and prevention mechanisms to reduce the occurrence of fraud within the network-based marketplace 4.

Messaging applications 68 are responsible for the generation and delivery of messages to users of the network-based marketplace 4, with such messages, for example, advising users regarding the status of listings at the network-based marketplace 4 (e.g., providing "outbid" notices to bidders during an auction process or providing promotional and merchandising information to users). The respective messaging applications 68 may utilize any one of a number of message delivery networks and platforms to deliver messages to users. For example, the messaging applications 68 may deliver electronic mail (e-mail), instant message (IM), Short Message Service (SMS), text, facsimile, or voice (e.g., Voice over IP (VoIP)) messages via the wired (e.g., Plain Old Telephone Service (POTS), or wireless (e.g., mobile, cellular, WiFi (e.g., IEEE 802.11 technologies including 802.11n, 802.11b, 802.11g, and 802.11a), or Worldwide Interoperability for Microwave Access (e.g., WiMAX—IEEE 802.16)) networks.

Merchandising applications 70 support various merchandising functions that are made available to sellers to enable sellers to increase sales via the network-based marketplace 4. The merchandising applications 70 also operate the various merchandising features that may be invoked by sellers and may monitor and track the success of merchandising strategies employed by sellers. In addition, the user may utilize transaction incentivizing applications 72 to select one or more criteria that may be used to generate incentives for a user. Image fitment applications 3 may facilitate the fitment of an image of an inventory part 27 to an image of a vehicle part and the building of vehicle and parts inventories.

Data Structures

Figure 7:
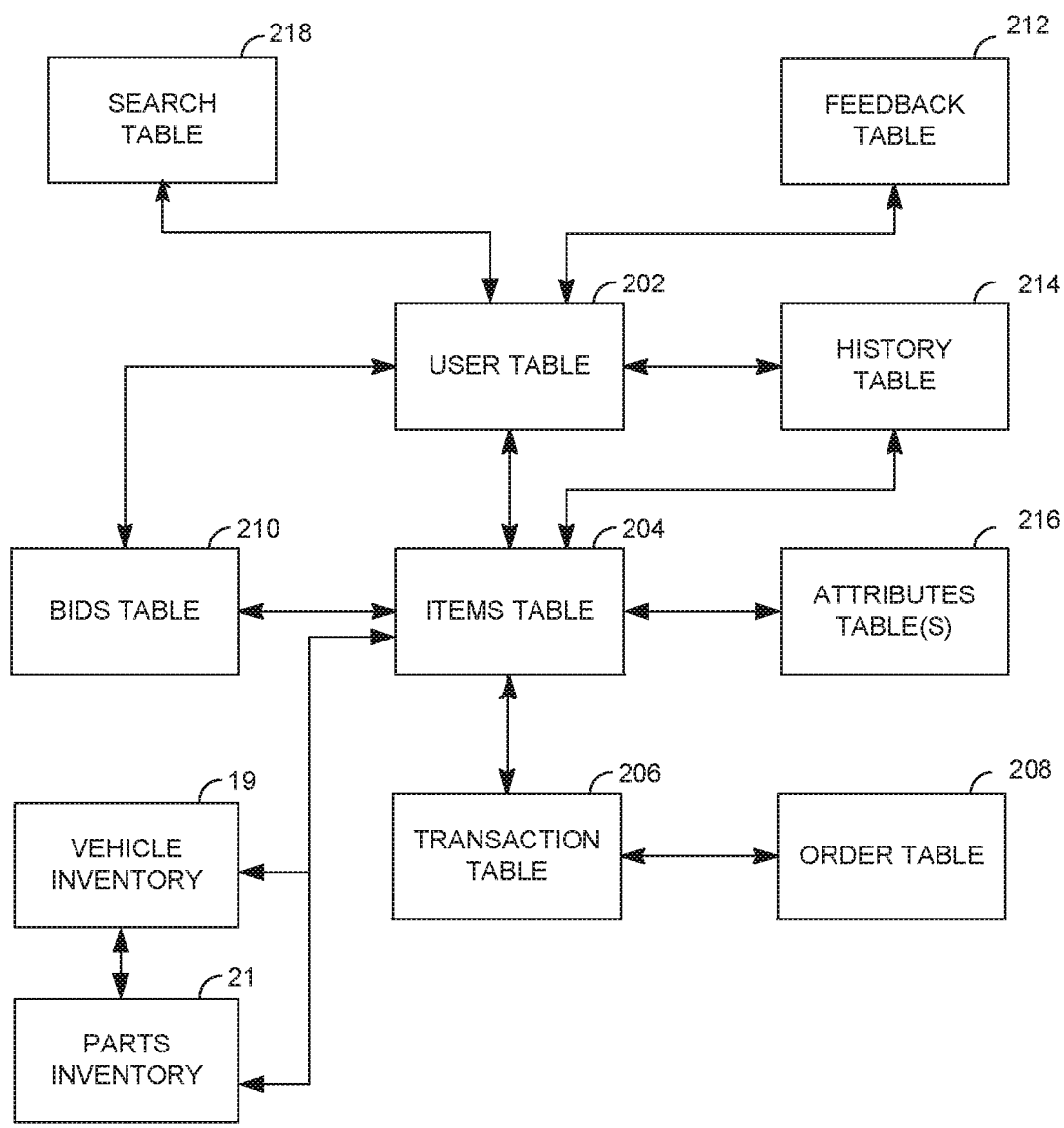
FIG. 7 is a block diagram illustrating tables, according to an embodiment.

FIG. 7 is a high-level entity-relationship diagram, illustrating various tables 200 that may be maintained within the databases 9 of FIG. 5, and that are utilized by and support the marketplace applications 30 and payment applications 32, both of FIG. 6. A user table 202 may contain a record for each of the registered users of the network-based marketplace 4 of FIG. 5. A user may operate as a seller, a buyer, or both, within the network-based marketplace 4. In one example embodiment, a buyer may be a user that has accumulated value (e.g., commercial or proprietary currency), and is accordingly able to exchange the accumulated value for items that are offered for sale by the network-based marketplace 4.

The tables 200 may also include an items table 204 in which item records (e.g., listings) are maintained for goods and services (e.g., items) that are available to be, or have been, transacted via the network-based marketplace 4. Item records (e.g., listings) within the items table 204 may furthermore be linked to one or more user records within the user table 202, so as to associate a seller and one or more actual or potential buyers with an item record (e.g., listing).

A transaction table 206 may contain a record for each transaction (e.g., a purchase or sale transaction or auction) pertaining to items for which records exist within the items table 204.

An order table 208 may be populated with order records, with each order record being associated with an order. Each order, in turn, may be associated with one or more transactions for which records exist within the transaction table 206.

Bid records within a bids table 210 may relate to a bid received at the network-based marketplace 4 in connection with an auction-format listing supported by an auction application 42 of FIG. 3. A feedback table 212 may be utilized by one or more reputation applications 48 of FIG. 3, in one example embodiment, to construct and maintain reputation information concerning users in the form of a feedback score. A history table 214 may maintain a history of transactions to which a user has been a party. One or more attributes tables 216 may record attribute information that pertains to items for which records exist within the items table 204. Considering only a single example of such an attribute, the attributes tables 216 may indicate a currency attribute associated with a particular item, with the currency attribute identifying the currency of a price for the relevant item as specified by a seller. A search table 218 may store search information that has been entered by a user (e.g., a buyer) who is looking for a specific type of listing. Finally, a vehicle inventory 19 and part inventory 21, as previously described, are included in the tables 200.

Figure 8A:
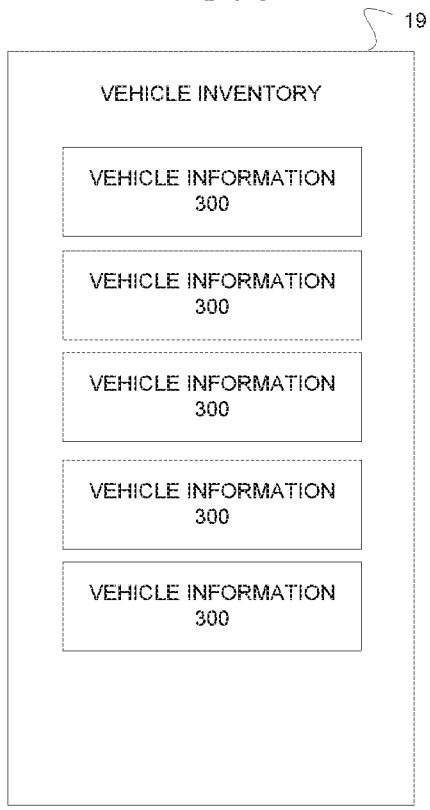
FIG. 8A is a block diagram illustrating a vehicle inventory, according to an embodiment.

FIG. 8A is a block diagram illustrating a vehicle inventory 19, according to an embodiment. The vehicle inventory 19 may include multiple entries of vehicle information 300 that respectively describe vehicles (e.g., cars, trucks, sports utility vehicles, all-terrain vehicles, motorcycles, etc.).

Figure 8B:
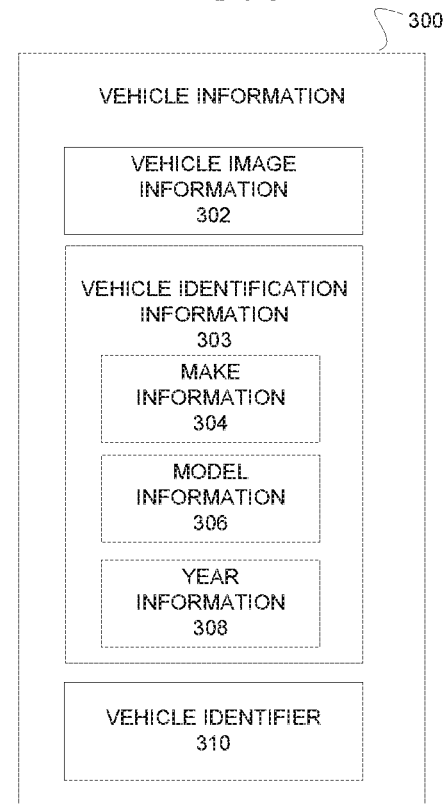
FIG. 8B is a block diagram illustrating vehicle information, according to an embodiment.

FIG. 8B is a block diagram illustrating vehicle information 300, according to an embodiment. The vehicle information 300 may include vehicle image information 302, vehicle identification information 303, and a vehicle identifier 310. The vehicle image information 302 may include information that may be utilized to match images of vehicles that are received by the network-based marketplace 4. For example, the vehicle image information 302 may include one or more sets of keypoints. A keypoint may include a descriptor vector and a direction. The vector may be based on any one of multiple technologies that are being used in computer vision to detect and describe features in images. The vehicle identification information 303 may include make information 304, model information 306, and year information 308. The vehicle identifier 310 may uniquely identify the vehicle in the network-based marketplace 4 and be utilized to identify inventory image information 25, as described below.

FIG. 8C is a block diagram illustrating a part inventory 21, according to an embodiment. The part inventory 21 may include multiple entries of part information 320 that respectively describe parts that are compatible with vehicles according to the vehicle identifiers 310 in the vehicle information 300. For example, parts for a vehicle may include body and main parts, electrical and electronic parts, interior parts, engine component parts, and other parts. The body and main parts may include a hood, bumper, cowl screen, fender, door, door handle, windows, sunroof, roof rack, spoiler, hubcabs, wheels, trunk, trim package, door locks, windshield, etc. The electrical and electronic parts may include an antenna, radio and media players, speakers, tuners, alternator, alternator fan, battery, battery accessories, gauges and meters, spark plugs, fog lights, headlights, taillights, airbag sensors, engine sensors, fuel sensors, oil sensors, starter, switches, etc. The interior parts may include car seats, steering wheels, seat belts, seat covers, mirrors, door locks, etc. The engine component parts may include camshafts, air ducts, connecting rods, crankshafts, drive belts, engine blocks, fan belts, heaters, etc. Accordingly, the part inventory 21 may include any part visible to a camera that generates a digital file (e.g., JPEG) that includes an image of a vehicle.

FIG. 8D is a block diagram illustrating part information 320, according to an embodiment. The part information 320 may include the part identifier 311, a part type 322, vehicle identifiers 310, inventory image information 25, as previously described, and a product number 324. The part identifier 311 may uniquely identify the part in a system. For example, the part identifier 311 may identify a particular part that is purchased from a part provider and uniquely identified by the network-based marketplace 4. The part type 322 may indicate a type of part. For example, part types 322 may include hubcaps, wheels, tail lights, rear view mirrors, and any other types of parts found on a vehicle, as described above. The vehicle identifiers 310 may identify a set of vehicles for which the associated part is compatible. For example, the vehicle identifiers 310 may identify a Ford Ranger and Toyota Tacoma as compatible with the current part (e.g., hubcaps). The product number 324 may include a global trade number (GTIN), a universal product code (UPC), a manufacture part number (MPN) or some other standard product identifier that identifies the item being described.

FIG. 8E is a block diagram illustrating inventory image information 25, according to an embodiment. The inventory image information 25 may include an image of inventory background 29 and an image of an inventory part 27. The image of the inventory background 29 may include one or more sets of keypoints, as previously described, to generate the image of the inventory background 29 for the inventory image information 25. The image of the inventory part 27 may include one or more sets of keypoints, as previously described, to generate the image of the inventory part 27 for the inventory image information 25.

Figure 8F:
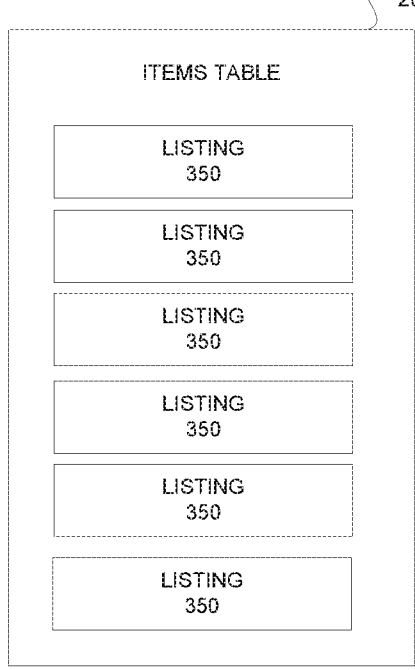
FIG. 8F is a block diagram illustrating an items table, according to an embodiment.

FIG. 8F is a block diagram illustrating an items table 204, according to an embodiment. The items table 204 may include multiple listings 350. Each listing 350 may be authored by a seller and describe an item or service that is being offered for sale or for auction on the network-based marketplace 4.

Figure 8G:
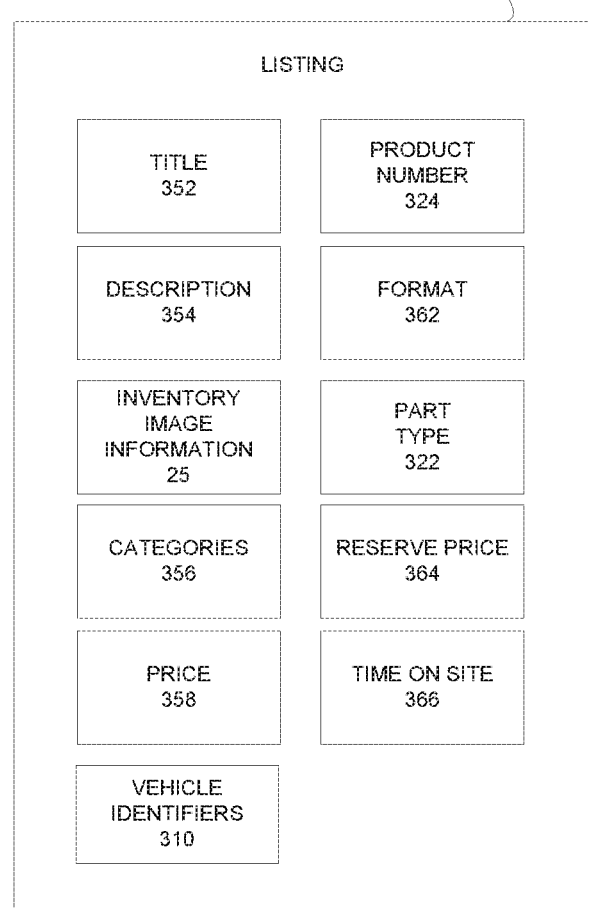
FIG. 8G is a block diagram illustrating a listing, according to an embodiment.

FIG. 8G is a block diagram illustrating a listing 350, according to an embodiment. The listing 350 may include a title 352, a description 354, inventory image information 25, one or more categorie(s) 356, a price 358, vehicle identifiers 310 (optional), a product number 324 (optional), a format 362, a part identifier 311 (optional), a reserve price 364, and a time on site 366.

The inventory image information 25 that is stored in the listing 350 may be communicated to the network-based marketplace 4 by the seller who is authoring the listing. According to one embodiment, the inventory image information 25 from the listing 350 may be utilized to fit an image of a vehicle part that is included in an image of a vehicle. To this end, the listing 350 that is utilized to provide the inventory image information 25 may be identified by matching the vehicle identifiers 310 in the listing 350 with the vehicle identifier 310 associated with the image of the vehicle and by matching the part type 322 in the listing 350 with the part type 322 provided by a user (e.g., FIG., see part selector 616 as shown on FIG. 11). Further for example, the listing 350 that is utilized to provide the inventory image information 25 may be identified via the parts inventory 21 based on matching part types 322 or matching product numbers 324.

The title 352 and description 354 may include text that is entered by the seller to describe the item. The one or more categorie(s) 356 may be assigned by the seller or the network-based marketplace 4 to locate the listing 350 under a navigable hierarchy of categories. The price 358 may be the asking price of the item or service for immediate purchase or the highest bid. The vehicle identifiers 310 and product number 324 were previously described. The format 362 may indicate whether the item is being auctioned, available for immediate purchase, or both (e.g., available for immediate purchase and auction until some criterion is satisfied (e.g., eBay Buy It Now)). The part type 322 was previously described. The reserve price 364 is the minimum bid to win the auction as configured by the seller of the item described by the listing 350. For example, the listing 350 may close without a winner in response to the reserve price 364 not being satisfied with the maximum bid. The time on site 366 is the time the item has been listed on the network-based marketplace 4 (e.g., if the same item has been listed in multiple auctions).

Figure 11:
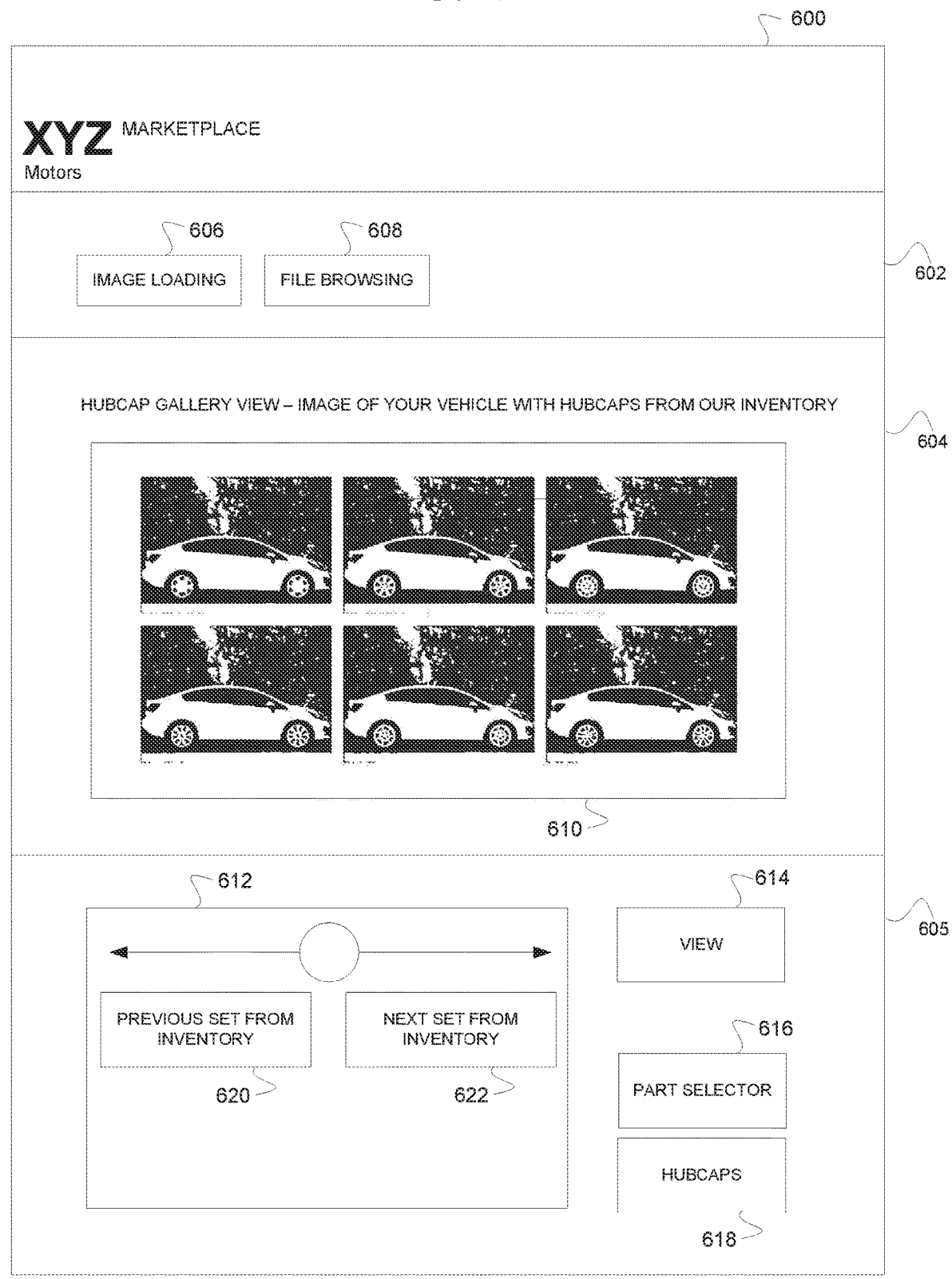
FIG. 11 is a block diagram illustrating a user interface, according to an embodiment.

FIG. 9 is a flow diagram illustrating a method 400, according to an embodiment, to fit an image of an inventory part. Illustrated on the left are operations performed by at a client machine 8 and illustrated on the right are operations performed at a network-based marketplace 4. The method 400 may commence at operation 402 with the client machine 8 communicating a selection that identifies a part type (e.g., hubcaps) and a file that includes an image of a vehicle. For example, the client machine 8 may communicate a selection from a pull-down menu selecting "hubcaps," as illustrated in FIG. 11. Also for example, the client machine 8 may communicate a Joint Photographic Experts Group (JPEG) file including an image of an Integra, as illustrated in FIG. 11.

At operation 404, at the network-based marketplace 4, the receiving module 11 may receive the selection identifying the part type (e.g., hubcaps) and the JPEG file containing the image of the vehicle (e.g., Integra). At operation 406, the fitment module 13 may identify one or more elements of inventory image information 25 that respectively include an image of inventory part 27 based on the selection of the part type 322 (e.g., hubcaps) that was received from the client machine 8 and the image of the vehicle (e.g., Integra) that was received from the client machine 8, described in further detail in FIG. 10D. For example, in the present example, the fitment module 13 may identify two-thousand images of hubcaps in a parts inventory 21 that are compatible with an Integra that may be identified in the image of the vehicle received from the client machine 8. In another embodiment, the fitment module 13 may identify three-thousand images of hubcaps in the items table 204 that are compatible with an Integra that may be identified in the image of the vehicle as received from the client machine 8. At operation 408, the fitment module 13 may automatically position two boundaries of a rectangle over the image of the vehicle based on the part type 322 that was received from the client machine 8 to form a rectangle and communicate a user interface that displays the rectangle as being superimposed over the image of the vehicle. For example, FIG. 1 includes an example of a user interface that includes an image of a vehicle with a rectangle that is superimposed over the image to contain a hubcap, as described above. In another embodiment, the user may manually position the boundaries of the rectangle over the image of the vehicle part that is being targeted rather than selecting a vehicle part selection from a pull-down menu, as described above. At operation 410, the fitment module 13 may fit the image of the inventory part 27 over an image of the vehicle part in the image of the vehicle, described in further detail in FIG. 10A. Further, the fitment module 13 may fit the image of the inventory part 27 over multiple images of the vehicle part in the image of the vehicle. For example, FIG. 11 illustrates the image of the vehicle being superimposed with images of hubcaps fitted respectively over both the front and back wheels of the car. At operation 412, the fitment module 13 may generate a user interface that includes the image of the vehicle fitted with the image of the inventory part 27 in one or more positions as is appropriate.

At operation 414, at the client machine 8, the user interface is received and displayed on a display device, the user interface including the image of the inventory part 27 (e.g., hubcap) being fitted over each of the corresponding images of the vehicle part (e.g., hubcap). For example, FIG. 1 includes an image of a convertible sports car that is shown from a side view with the image of the inventory part 27 for a hubcap being superimposed over the images of the vehicle parts of the sports car including both hubcaps.

Figure 10A:
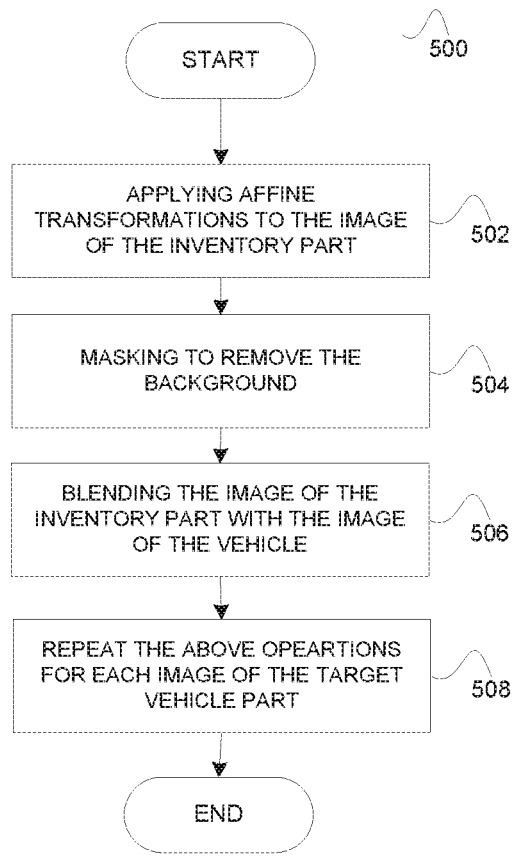
FIG. 10A is a flow diagram illustrating a method, according to an embodiment, to fit an image of an inventory part over one or more images of one type of vehicle part.

FIG. 10A is a flow diagram illustrating a method 500, according to an embodiment, to fit an image of an inventory part over one or more images of corresponding vehicle parts on the image of a vehicle. The method 500 corresponds to the operation 410 on FIG. 9. The method 500 commences at operation 502 where the fitment module 13 may apply affine transformation to the image of the inventory part 27 that was previously identified as matching the image of the vehicle part in the rectangle. For example, the fitment module 13 may rotate, squeeze, or stretch the inventory image information 25 to form a shape that is analogous to the image of the vehicle part that is being targeted in the image of the vehicle. The operation 502 is described in greater detail in FIG. 10B. At operation 504, the fitment module 13 may apply a mask to inventory image information 25 to remove the image inventory background 29 from the inventory image information 25, leaving the image of the inventory part 27 (e.g., hubcap). At operation 506, the fitment module 13 may blend the image of the inventory part 27 (e.g., hubcap) into the appropriate position in the image of the vehicle that was received from the client machine 8. At operation 508, the above operations 502, 504 and 506 are repeated for the targeted vehicle part with respect to the image of the vehicle. For example, a perspective view of a car includes two hubcaps that need different affine transformations, masking, and blending. Accordingly, the fitment module 13 may repeat the operations 502, 504 and 506 as is needed to fit each and every image of the vehicle part in the image of the vehicle (e.g., all of the images of hubcaps in the image of the vehicle).

According to another embodiment, the method 500 may be performed by the fitment module 13 at the client machine 8. For example, the inventory image information 25 may be communicated to the client machine 8 (e.g., smartphone, desktop computer, etc.) and the fitment module 13 may fit an image of an inventory part over one or more images of corresponding vehicle parts on the images of a vehicle as described above. In addition, a configurable number of inventory image information 25 may be communicated to the client machine 8 in anticipation of the user advancing to images of inventory parts 27 previously not viewed or back to images of inventory parts 27 that were previously viewed.

Figure 10B:
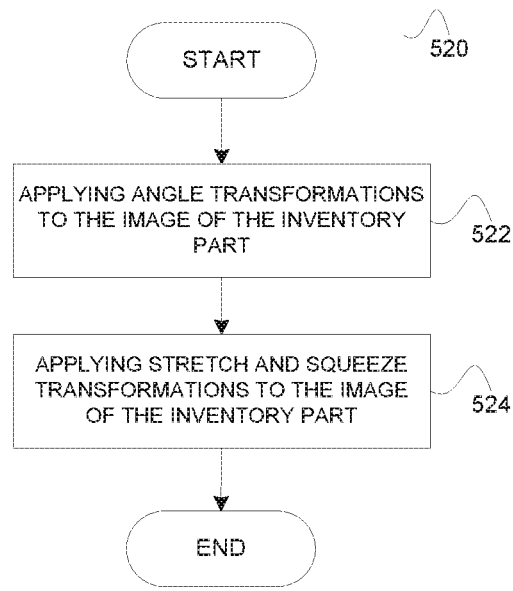
FIG. 10B is a flow diagram illustrating a method, according to an embodiment, to apply affine transformations.

FIG. 10B is a flow diagram illustrating a method 520, according to an embodiment, to apply affine transformations. The method 520 corresponds to the operation 502 on FIG. 10A. The method 520 commences at operation 522 where the fitment module 13 may apply angle affine transformation to inventory image information 25 that contains the image of the inventory part 27 as identified in operation 406. For example, the inventory image information 25 may be rotated out-of-plane around a center as previously described to fit the image of the inventory part 27 to the image of the vehicle part that is being targeted. Further, the inventory part 27 may be rotated in-plane to simulate a rotation of the image of the inventory part 27. At operation 524, the fitment module 13 may apply stretch and squeeze affine transformation to inventory image information 25 that contains the image of the inventory part 27. For example, the image may be stretched or squeezed in accordance with X or Y axis as previously described to fit the image of the inventory part 27 to the image of the vehicle part that is being targeted.

FIG. 10C is a flow diagram illustrating a method 540, according to an embodiment, to build vehicle and parts inventories. As described below, the method 540 may build vehicle and parts inventories based on a catalogue of vehicle images including associated meta-data, according to an embodiment. In accordance with another embodiment the method 540 may mine other sources of vehicle images and associated meta-data (e.g., Internet). The method may commence at operation 542 with the catalogue module 15 reading the next catalogue image and meta-data from the catalogue. For example, the metadata may include vehicle identification information 303 in association with an image of the vehicle and a unique vehicle identifier 310. At operation 544, the processing module 17 may remove catalogue background information from the catalogue image. For example, the processing module 17 may remove people and things from the image that may obscure any of the parts on vehicle. At operation 546, the processing module 17 may compute/assign a confidence value to the catalogue background removal operation. For example, the processing module 17 may assign the confidence value on factors such as image resolution, number of hubcaps/wheels shown in the image, and the like. At decision operation 548, the processing module 17 may identify whether the confidence value that was assigned exceeds a predetermined threshold. If the confidence value exceeds a predetermined threshold then processing continues at operation 550. Otherwise, processing continues at decision operation 556. At operation 550, the processing module 17 may extract inventory image information 25 from the processed catalogue image. For example, the processing module 17 may draw a bounding box (e.g., rectangle) around the part and extract the bounding box from the image to generate inventory image information 25. At operation 552, the processing module 17 may store the inventory image information 25 in association with part information 320 in the part inventory 21. For example, the processing module 17 may initialize the part type 322 and vehicle identifiers 310 based on the meta-data associated with the vehicle image in the catalogue. Further, the processing module 17 may initialize the part identifier 311 and the vehicle identifiers 310 to ensure both are properly assigned to uniquely identify vehicles and parts in the network-based marketplace 4. At operation 554, the processing module 17 may further update the vehicle information 300 in the vehicle inventory 19 based on the catalogue image and the meta-data. For example, the processing module 17 may update the vehicle inventory 19, and all of the fields of the vehicle information 300 utilizing the catalogue image and meta-data.

Figure 10D:
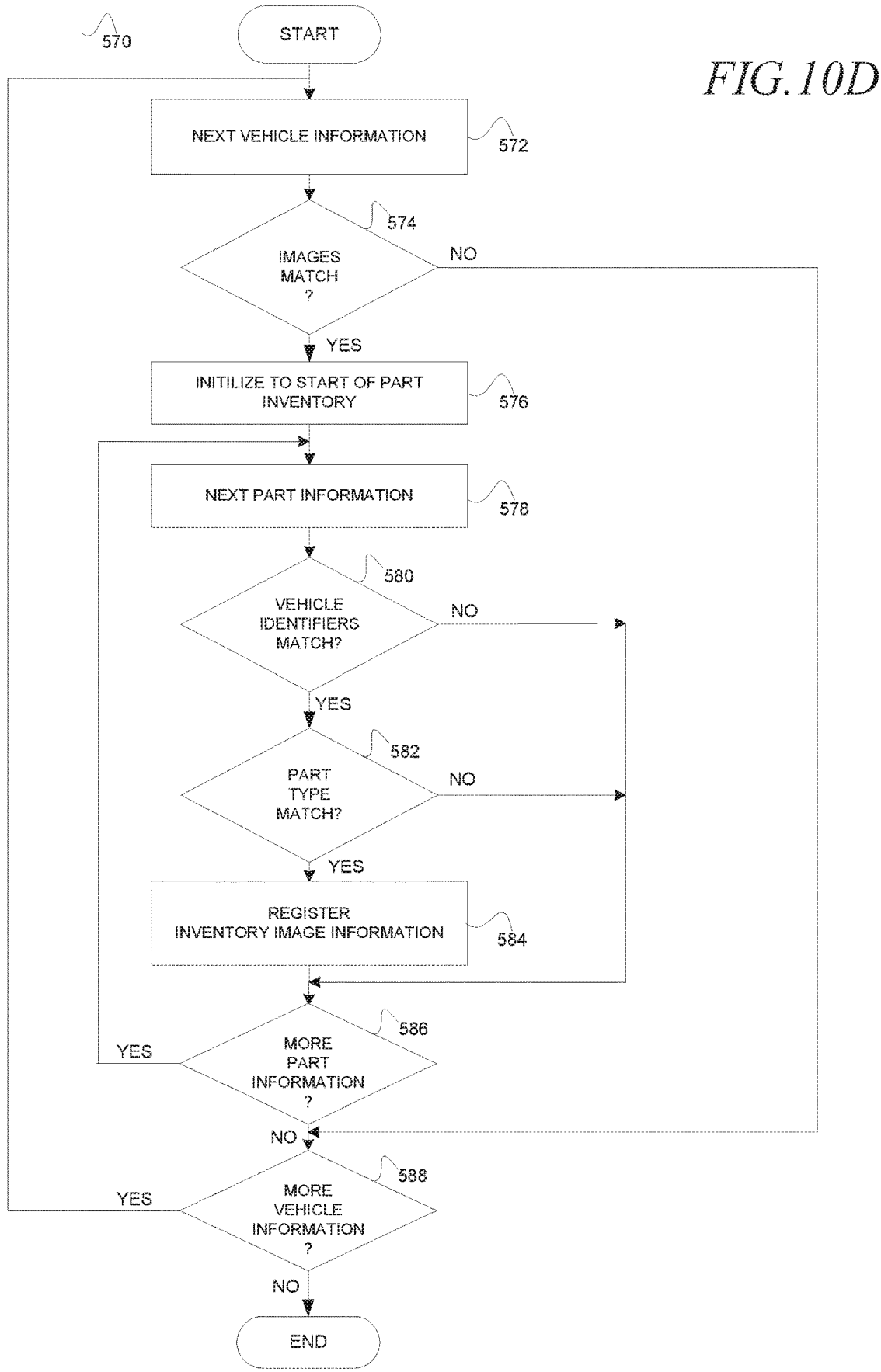
FIG. 10D is a flow diagram illustrating a method, according to an embodiment, to identify inventory image information.

FIG. 10D is a flow diagram illustrating a method 570, according to an embodiment, to identify one or more inventory image information 25. Recall that the inventory image information 25 includes an image of an inventory part 27. The method 570 corresponds to operation 406 on FIG. 9. The method 570 may commence with the fitment module 13 reading the next vehicle information 300 form the vehicle inventory 19. At decision operation 574, the fitment module 13 may identify whether the image of the vehicle received from the client machine 8 matches the vehicle image information 302 associated with the current vehicle information 300 in the vehicle inventory 19. If the image of the vehicle matches the vehicle image information 302, then processing continues at operation 576. Otherwise processing continues at decision operation 588. At operation 576, the fitment module 13 may initialize to the beginning of the part inventory 21. At operation 578, the fitment module 13 reads the next part information 320 from the part inventory 21. At decision operation 580, the fitment module 13 may identify whether the vehicle identifiers 310 in the current part information 320 (e.g., part) in the part inventory 21 match any of the vehicle identifiers 310 for the current vehicle information 300 (e.g., vehicle). If the vehicle identifiers 310 match, then processing continues at decision operation 582. Otherwise processing continues at decision operation 586. At decision operation 582, the fitment module 13 may identify whether the part type 322 in the current part information 320 (e.g., part) in the part inventory 21 matches the part type 322 received from the client machine 8 or identified with the user positioning the rectangle to contain an image of a vehicle part in the image of the vehicle. If the part types 322 match, then processing continues at operation 584. At operation 584, the fitment module 13 may register the inventory image information 25 (e.g., current part information 320) (e.g., inventory part) for fitment over an image of a vehicle part in the image of the vehicle. In another embodiment, the fitment module 13 may register the inventory image information 25 from one or more listings 350 in the items table 204 for fitment over an image of a vehicle part in the image of the vehicle. For example, the fitment module 13 may further continue to process to identify a predetermined number of listings 350 that match the current vehicle identifier 310 and the current part type 322 that is associated with the current part information 320. Otherwise processing continues at decision operation 586. At decision operation 586, the fitment module 13 may identify whether the part inventory 21 includes more part information 320. If the part inventory 21 includes more part information 320, then process continues at operation 578. Otherwise processing continues at decision operation 588. At decision operation 588, the fitment module 13 may identify whether the vehicle inventory 19 includes more vehicle information 300. If the vehicle inventory 19 includes more vehicle information 300, then processing for the method 570 ends. Otherwise processing continues at operation 572.

FIG. 11 is a block diagram illustrating a user interface 600, according to an embodiment. The user interface 600 may be displayed on the client machine 8. The user interface 600 may be used to display a gallery of images of a vehicle that are superimposed with different images of inventory parts (e.g., different hubcaps). The user interface 60X may also be used to display a single image of a vehicle that is superimposed with an image of an inventory part (e.g., same hubcap). The user interface 600 may include a file loading panel 602, a display panel 604, and a control panel 605. The file loading panel 602 may include an image loading control 606 and a file browsing control 608. The file browsing control 608 may be used to search a directory structure in a client machine (e.g., client machine 8) and select a file. For example, the selected file may include a JPEG file including an image of a vehicle. The image loading control 606 may be used to communicate a selected file from the client machine 8 to the network-based marketplace 4. In another embodiment, a snapshot of the image of the vehicle may be captured with a camera that is included in a mobile device 14 and communicated to the network-based marketplace 4 using the mobile device 14 (e.g., iPhone) or some other device. In another embodiment, a motion shot of the image of the vehicle may be captured with a camera and communicated to the network-based marketplace 4. For example, a YouTube video including the image of the vehicle may be captured and communicated to the network-based marketplace 4. In another embodiment, a live-shot of the image of the vehicle may be captured with a camera and communicated to the network-based marketplace 4 in real-time. For example, the live-shot of the vehicle may be fitted with inventory image information 25 and continually refitted with inventory image information 25 as the vehicle moves in real-time and is being captured in the live-shot. According to the embodiment relating to the live-shot, the affine transformations, masking, and blending, as described in FIG. 10A need be performed by the fitment module 13 on the client machine 8/mobile device 14 (e.g., iPhone). For example, the fitment module 13, at the mobile device 14, may continually fit the image of the first inventory part over the image of the first vehicle part as the image of the vehicle changes perspective in real time. Further, according to the live-shot embodiment, a configurable number of inventory image information 25 may be communicated to the client machine 8 in anticipation of the user advancing to images of inventory parts 27 that were previously not viewed or back to images of inventory parts 27 that were previously viewed. The display panel 604 is illustrated as displaying a gallery of six side-views of the image of the vehicle that was communicated from the client machine 8 to the network-based marketplace 4. Other embodiments may display four, eight, ten or other numbers of copies of the image of the vehicle. The six copies are respectively superimposed with different images of inventory parts 27 (e.g., hubcaps). For example, each side-view is displayed with a one image of inventory part 27 that is fitted to the front wheel and then to the back wheel. The display panel 604 may further display a single large image of a side-view of the image of the vehicle that was communicated from the client machine 8 to the network-based marketplace 4. The control panel 605 may include a gallery control panel 612, a view control 614, a part selector 616, and a part display 618. The gallery control panel 612 may control the display of the gallery of six side-views. To this end, the gallery control panel 612 may include a previous-set control 620 that may be selected to display inventory sets of images of inventory parts 27 (e.g., hubcaps) associated with earlier part identifiers 311 (e.g., lower numbered part identifiers 311) and a next-set control 622 that may be selected to display sets of images of inventory parts 27 associated with later part identifiers 311 (e.g., higher numbered part identifiers 311). The view control 614 may be selected to toggle between two views including a single image of the vehicle or a gallery of images of the vehicle. The part selector 616 may include a pull-down menu that may be used to select the type of part to fit to the vehicle (e.g., hubcap, wheel, mirror, head light, tail light, antenna, spoiler, etc.) and the part display 618 displays the selected part.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a stand-alone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. In embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, or software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture

Figure 12:
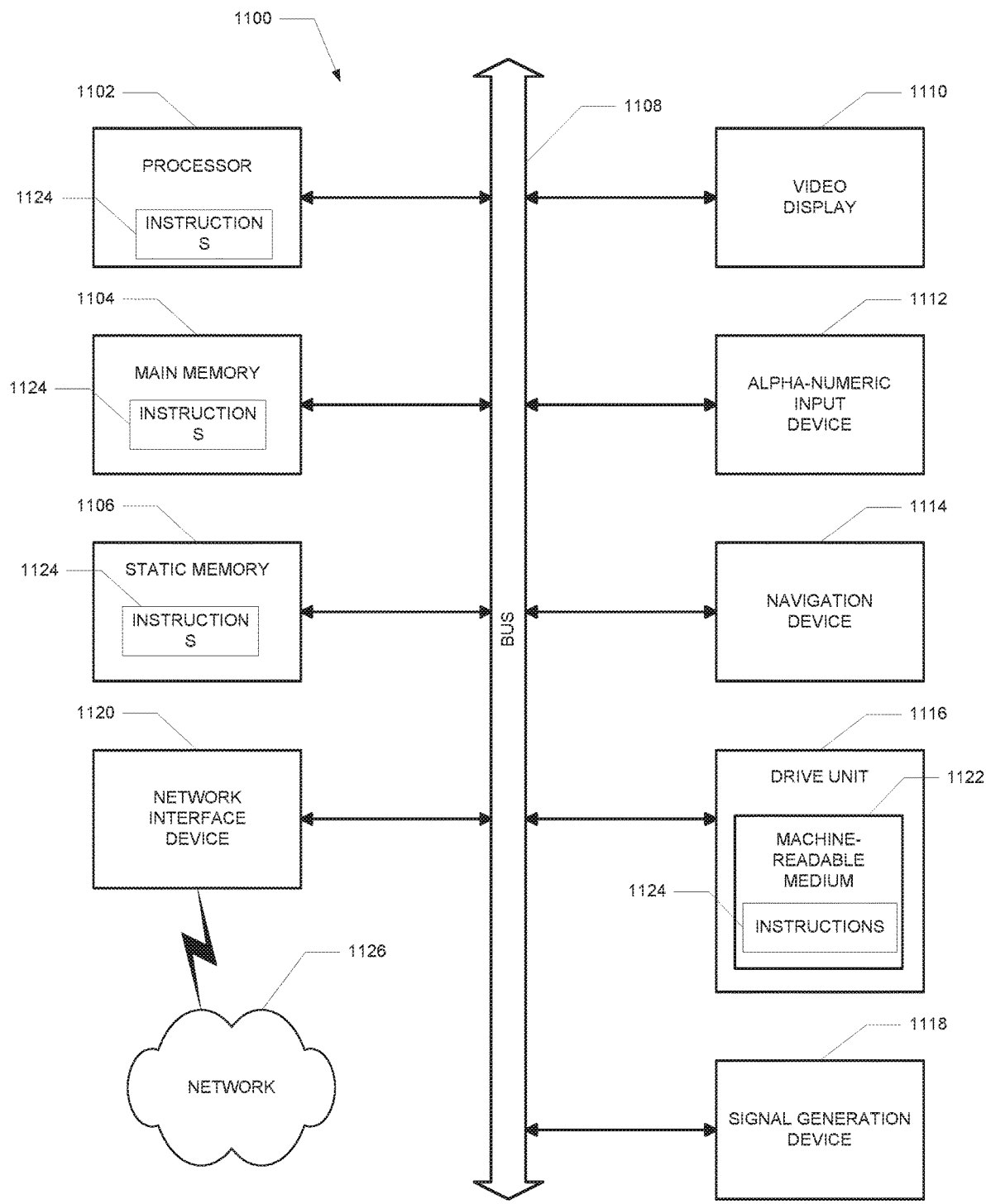
FIG. 12 shows a diagrammatic representation of a machine in the example form of a computer system, according to an example embodiment.

FIG. 12 is a block diagram of a machine within which instructions may be executed for causing the machine to perform any one or more of the methodologies discussed herein. The machine (e.g., computer system) may be embodied as the mobile device 14 and the network-based marketplace 4. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any other machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., cursor control) (e.g., a mouse), a drive unit 1116, a signal generation device 1118 (e.g., a speaker) and a network interface device 1120.

Machine-Readable Medium

The drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. Instructions 1124 may also reside within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories and optical and magnetic media Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks, and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to fit an image of an inventory part were disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

We claim:

1. A device, comprising:
    a camera;
    an electronic display;
    hardware processing circuitry; and
    a hardware memory storing instructions that when executed configure the hardware processing circuitry to perform operations comprising:
        receiving one or more images of one or more items over a computer network from a server, the received one or more images including a first image of a first vehicle part;
        removing a background from the received one or more images of the one or more items to generate a modified image;
        determining a parts inventory for a vehicle associated with the modified image based on a confidence value that the modified image depicts the vehicle, wherein the parts inventory comprises images of a plurality of vehicle parts that are compatible with the vehicle, and wherein the plurality of vehicle parts includes a subset of vehicle parts that comprise a same part type as the first vehicle part;
        capturing a video of the vehicle using the camera;
        receiving one or more boundaries of a shape in the video;
        automatically identifying, based on a combination of one or more parts in the parts inventory and the vehicle, the first image of the first vehicle part;
        automatically fitting the first image of the first vehicle part inside the shape in the video of the vehicle, the fitting comprising applying an affine transformation to the first image of the first vehicle part based on the one or more boundaries of the shape in the video;
        playing, on the electronic display, the video of the vehicle, the video comprising the first image of the first vehicle part fitted to the video of the vehicle; and
        continually refitting the first image of the first vehicle part to the video of the vehicle as the vehicle changes perspective in the video, the refitting comprising applying the affine transformation to the first image of the first vehicle part based on the one or more boundaries of the shape in the video.

2. The device of claim 1, the operations further comprising masking the first image of the first vehicle part to remove the background of the first image of the first vehicle part before refitting the first image to the video of the vehicle.

3. The device of claim 2, the operations further comprising blending the first image of the first vehicle part with the video of the vehicle.

4. The device of claim 3, the operations further comprising in response to a selection of a second vehicle part, continually refitting a second image of the second vehicle part to video of the vehicle as the vehicle changes perspective in the video by applying an affine transformation to the second image of the second vehicle part.

5. The device of claim 1, the operations further comprising iteratively refitting additional images of additional items to the vehicle as the vehicle changes perspective in the video by applying affine transmissions to each of the additional images of the additional items.

6. The device of claim 1, wherein the affine transformation to the first image of the first vehicle part comprises applying an out-of-plane rotating affine transformation on the first image.

7. The device of claim 1, further comprising a mobile phone handset.

8. A non-transitory computer readable medium comprising instructions that when executed by hardware processing circuitry configure the hardware processing circuitry to perform operations comprising:
    receiving one or more images of one or more items over a computer network from a server, the received one or more images including a first image of a first vehicle part;

removing a background from the received one or more images of the one or more items to generate a modified image;

determining a parts inventory for a vehicle associated with the modified image based on a confidence value that the modified image depicts the vehicle, wherein the parts inventory comprises images of a plurality of vehicle parts that are compatible with the vehicle, and wherein the plurality of vehicle parts includes a subset of vehicle parts that comprise a same part type as the first vehicle part;

capturing a video of the vehicle using a camera;

receiving one or more boundaries of a shape in the video;

automatically identifying, based on a combination of one or more parts in the parts inventory and the vehicle, the first image of the first vehicle part;

automatically fitting the first image of the first vehicle part inside the shape in the video of the vehicle, the fitting comprising applying an affine transformation to the first image of the first vehicle part based on the one or more boundaries of the shape in the video;

playing, on an electronic display, the video of the vehicle, the video comprising the first image of the first vehicle part fitted to the video of the vehicle; and continually refitting the first image of the first vehicle part to the video of the vehicle as the vehicle changes perspective in the video, the refitting comprising applying the affine transformation to the first image of the first vehicle part based on the one or more boundaries of the shape in the video.

9. The non-transitory computer readable medium of claim 8, the operations further comprising masking the first image of the first vehicle part to remove the background of the first image of the first vehicle part before refitting the first image to the video of the vehicle.

10. The non-transitory computer readable medium of claim 9, the operations further comprising blending the first image of the first vehicle part with the video of the vehicle.

11. The non-transitory computer readable medium of claim 10, the operations further comprising in response to a selection of a second vehicle part, continually refitting a second image of the second vehicle part to video of the vehicle as the vehicle changes perspective in the video by applying an affine transformation to the second image of the second vehicle part.

12. A method comprising:

receiving one or more images of one or more items over a computer network from a server, the received one or more images including a first image of a first vehicle part;

removing, by processing circuitry, a background from the received one or more images of the one or more items to generate a modified image;

determining, by the processing circuitry, a parts inventory for a vehicle associated with the modified image based on a confidence value that the modified image depicts the vehicle, wherein the parts inventory comprises images of a plurality of vehicle parts that are compatible with the vehicle, and wherein the plurality of vehicle parts includes a subset of vehicle parts that comprise a same part type as the first vehicle part;

capturing a video of the vehicle using a camera;

receiving one or more boundaries of a shape in the video;

automatically identifying, based on a combination of one or more parts in the parts inventory and the vehicle, the first image of the first vehicle part;

automatically fitting the first image of the first vehicle part inside the shape in the video of the vehicle, the fitting comprising applying an affine transformation to the first image of the first vehicle part based on the one or more boundaries of the shape in the video;

playing, on an electronic display, the video of the vehicle, the video comprising the first image of the first vehicle part fitted to the video of the vehicle; and continually refitting the first image of the first vehicle part to the video of the vehicle as the vehicle changes perspective in the video, the refitting comprising applying the affine transformation to the first image of the first vehicle part based on the one or more boundaries of the shape in the video.

13. The method of claim 12, further comprising masking the first image of the first vehicle part to remove the background of the first image of the first vehicle part before refitting the first image to the video of the vehicle.

14. The method of claim 13, further comprising blending the first image of the first vehicle part with the video of the vehicle.

15. The method of claim 14, further comprising in response to a selection of a second vehicle part, continually refitting a second image of the second vehicle part to video of the vehicle as the vehicle changes perspective in the video by applying an affine transformation to the second image of the second vehicle part.

16. The method of claim 12, further comprising iteratively refitting additional images of additional items to the vehicle as the vehicle changes perspective in the video by applying affine transmissions to each of the additional images of the additional items.

17. The method of claim 12, wherein the affine transformation to the first image of the first vehicle part comprises applying an out-of-plane rotating affine transformation on the first image.

18. The device of claim 1, wherein the operations further comprise identifying the first vehicle part from the first image based on a position of a rectangle over the vehicle.

19. The device of claim 18, wherein the operations further comprise assigning the confidence value to the first image based on a number of wheels or hubcaps; and storing, based on the confidence value, the first image in an inventory database, wherein the first vehicle part is identified from the inventory database.

* * * * *